(12) United States Patent
Vinayakumar et al.

(10) Patent No.: US 12,155,621 B2
(45) Date of Patent: Nov. 26, 2024

(54) NETWORK ADDRESS TRANSLATION BETWEEN NETWORKS

(71) Applicant: Oracle International Corporation, Redwood Shores, CA (US)

(72) Inventors: Shreyas Vinayakumar, Santa Clara, CA (US); Abhiman Yashpala Karkera, San Jose, CA (US); Siddharth Rampura Chandraprabhuraju, Sunnyvale, CA (US); Saurabh Agarwal, Fremont, CA (US); Soumya Kailasa, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/514,488

(22) Filed: Oct. 29, 2021

(65) Prior Publication Data
US 2022/0200952 A1    Jun. 23, 2022

Related U.S. Application Data

(60) Provisional application No. 63/128,489, filed on Dec. 21, 2020.

(51) Int. Cl.
*H04L 61/2503* (2022.01)
*H04L 61/5007* (2022.01)
*H04L 61/5061* (2022.01)

(52) U.S. Cl.
CPC ...... *H04L 61/2503* (2013.01); *H04L 61/5007* (2022.05); *H04L 61/5061* (2022.05)

(58) Field of Classification Search
None
See application file for complete search history.

(56) References Cited

U.S. PATENT DOCUMENTS 7,042,876 B1    5/2006 Jayasenan et al.
7,450,499 B2 *  11/2008 Park ...................... H04L 12/66
                                              370/254

(Continued)

FOREIGN PATENT DOCUMENTS

CN    101626406 A  *  1/2010
CN    101800690 A      8/2010

(Continued)

OTHER PUBLICATIONS

"Big-IP AFM Operations Guide | Chapter 4: Network Address Translation (NAT)", Ask F5, Available Online at: https://support.f5.com/csp/article/K41572395, Oct. 9, 2018, 8 pages.

(Continued)

*Primary Examiner* — Younes Naji
(74) *Attorney, Agent, or Firm* — Kilpatrick Townsend & Stockton LLP

(57) ABSTRACT

Techniques for performing NAT operations to send packets between networks are described. In an example, a network device receives a packet that comprises a header. The header indicates a source address of a first computing resource in a first network and a destination address of a second computing resource in a second network. The network device determines a pool of identifiers allocated for the first network and the second computing resource and identifies a packet flow based on the header. The network device also determines that no identifier from the pool of identifiers has been allocated for the packet flow and determines an identifier available to allocate for the packet flow from the pool of identifiers. The network device performs a NAT operation on the packet based on the identifier.

19 Claims, 19 Drawing Sheets

(56) References Cited

U.S. PATENT DOCUMENTS

| | | | |
|---|---|---|---|
| 7,814,232 B2* | 10/2010 | Satapati | H04L 67/1001 709/249 |
| 8,289,968 B1* | 10/2012 | Zhuang | H04L 61/2532 370/252 |
| 9,003,002 B2 | 4/2015 | Patel et al. | |
| 9,178,846 B1* | 11/2015 | Kamisetty | H04L 63/02 |
| 9,479,597 B2* | 10/2016 | Vinapamula Venkata | H04L 61/2517 |
| 9,525,661 B2* | 12/2016 | Patel | H04L 61/2575 |
| 9,614,761 B1 | 4/2017 | Kamisetty et al. | |
| 10,587,571 B2 | 3/2020 | Babu et al. | |
| 11,153,203 B2* | 10/2021 | Osman | H04L 45/34 |
| 2005/0010822 A1 | 1/2005 | Zhou et al. | |
| 2009/0103537 A1* | 4/2009 | Takahashi | H04L 67/1023 370/392 |
| 2011/0047256 A1* | 2/2011 | Babu | H04L 61/2521 709/223 |
| 2016/0380848 A1* | 12/2016 | Raney | H04L 67/131 709/213 |
| 2018/0034769 A1* | 2/2018 | Modi | H04L 67/1021 |
| 2020/0076765 A1* | 3/2020 | Paunikar | H04L 61/25 |
| 2022/0045987 A1* | 2/2022 | Warburton | H04L 63/0245 |

FOREIGN PATENT DOCUMENTS

| | | |
|---|---|---|
| CN | 101247421 B | 9/2011 |
| WO | WO-2019144826 A1 * | 8/2019 |

OTHER PUBLICATIONS

"Carrier-Grade NAT Implementation", Available Online at: https://www.juniper.net/documentation/en_US/junos/topics/concept/nat-best-practices.html, Jul. 29, 2019, 14 pages.

"Cloud NAT Address and Port Overview", Google Cloud, Available Online at: https://cloud.google.com/nat/docs/ports-and-addresses, Accessed from internet on Dec. 21, 2020, 15 pages.

"IP Addressing: NAT Configuration Guide, Cisco IOS Release 15M&T", Cisco Systems, Inc., Available Online at: https://www.cisco.com/c/en/us/td/docs/ios-xml/ios/ipaddr_nat/configuration/15-mt/nat-15-mt-book/iadnat-fpg-port-alloc.html, 2019, 242 pages.

Balachandran, "AWS VPC NAT Instance Failover and High Availability", Available Online at: https://dzone.com/articles/aws-vpc-nat-instance-failover, Mar. 28, 2013, 6 pages.

James et al., "Smart Port Allocation in Adaptive NoC Routers", 28th International Conference on VLSI Design and 14th International Conference on Embedded Systems, Available Online at: https://www.iitg.ac.in/johnjose/Publications/C10_VLSID2015_Reenu.pdf, 2015, pp. 475-480.

Levkowetz et al., "Mobile IP Traversal of Network Address Translation (NAT) Devices", Available Online at: https://www.hjp.at/doc/rfc/rfc3519.html, Apr. 2003, 34 pages.

Takeda, "Symmetric NAT Traversal using STUN", Panasonic Communications Research Laboratory, Available Online at: https://tools.ietf.org/id/draft-takeda-symmetric-nat-traversal-00.txt, Jun. 2003, 21 pages.

* cited by examiner initialize free ports 11,12,13

```
ring      11  12  13   X
              h       t aux array  1, 2, 3
``` allocated() gives 11 to caller, head advances to position 2

```
ring      X   12  13   X
              h       t
``` aux array is now -1, 2, 3 since 11 no longer exists in the ring free (11) by caller returns 1 to pool, tail advances to position 1

```
ring      X   12  13   11
          t       h
``` aux array is now 4, 2, 3 since 11 is now stored at position 4.

caller requests allocate_specific(13)

Lookup in aux array returns position 3 in the ring above. we swap 13 with 12 which is at the head

```
          X   12  13   11
          t   h
``` aux array is now 4, 2, -1 since 13 is no longer present.

FIG. 13

NETWORK ADDRESS TRANSLATION BETWEEN NETWORKS

CROSS-REFERENCE TO RELATED APPLICATIONS

This present application is a non-provisional application of, and claims the benefit and priority under 35 U.S.C. 119(e) of U.S. Provisional Application No. 63/128,489, filed on Dec. 21, 2020, the entire contents of which is incorporated by reference for all purposes.

BACKGROUND

A computing resource can belong to a network and can have a network address. Communications to and/or from the computing resource can rely on the network address. In certain situations, the computing resource can have a private network address and a public network address. When the computing device communicates with another computing resource that is outside of the network, the communication flow can use the two addresses. In particular, a network address translation operation can be used such that the private network address is replaced with the public network address for the part of the communication flow occurring outside of the network, and/or such that the public network address is replaced with the private network address for the part of the communication flow occurring within the network.

BRIEF SUMMARY

The present disclosure relates generally to network address translation (NAT) operations. More specifically, a NAT device can translate between addresses of a computing resources that belongs to a network (e.g., between private and public network addresses of the computing device). The NAT device identifies a communication flow between the computing resource and another computing resource that may not belong to the network. When a packet of the communication flow is being processed, the NAT device uses the identifier of the communication flow to determine whether NAT information is associated therewith. If no association exists yet between the identifier and the NAT information, an identifier from a pool of identifiers is allocated to the communication flow. Otherwise, the associated NAT information is applied to the packet. The allocation can involve the NAT device selecting an identifier from the pool that the NAT device stores locally for communication flows of the network, checking with a centralized database whether this identifier is not currently allocated to another communication flow, and depending on this check either (i) proceeding with the allocation or (ii) receiving another identifier that the centralized database indicates to be available. In both cases, the centralized database maintains data indicating the allocation of an identifier to the communication flow. In this way, when the NAT device or another NAT device processes additional packet of the communication flow, the same NAT information can be applied. When the communication flow is terminated, the identifier can be released after some time delay such that it becomes available for use in association with another communication flow.

In an example, the present disclosure relates to a method that includes receiving, by a network device configured to perform network address translation (NAT) operations, a packet that comprises a header. The header indicates a source address of a first computing resource in a first network and a destination address of a second computing resource in a second network. The method also includes determining, by the network device, a pool of identifiers allocated for the first network and the second computing resource. The method also includes identifying, by the network device and based on the header, a packet flow. The method also includes determining, by the network device, that no identifier from the pool of identifiers has been allocated for the packet flow. The method also includes determining, by the network device, an identifier available to allocate for the packet flow from the pool of identifiers. The method also includes performing, by the network device, a NAT operation on the packet based on the identifier. Performing the NAT operation includes replacing at least a portion of the header of the packet with the identifier.

In an example, the identifier includes at least one of a NAT source port or a NAT source internet protocol (IP) address.

In an example, determining the identifier includes selecting, by the network device, the identifier from the pool of identifiers, determining, by the network device, that the identifier is allocable to the packet flow based on a request to a database and a response from the database. The database maintains information about identifiers allocated for packet flows processed by a plurality of network devices, the plurality of network devices including the network device receiving the packet.

In an example, the identifier is a first identifier. Determining the identifier includes: selecting, by the network device, a second identifier from the pool of identifiers, sending, by the network device, a requested to a database about the second identifier, and receiving, by the network device from the database, a response indicating that the second identifier is unusable and indicating that the first identifier is allocable for the packet flow. The database maintains information about identifiers allocated for packet flows processed by a plurality of network devices, the plurality of network devices including the network device receiving the packet.

In an example the method further includes storing, by the network device in one or more data structures, identifiers available to allocate from the pool of identifiers, the one or more data structures stored in a memory of the network device, and updating, by the network device, the one or more data structures to indicate that the identifier is allocated for the packet flow.

In an example, the method further includes storing, by the network device in one or more data structures, the pool, first information indicating allocations of first identifiers from the pool to packet flows, and second information indicating an order of allocating second identifiers that are available from the pool and that have not been allocated yet, selecting, by the network device, the identifier based on the second information, and updating, by the network device, the one or more data structures to indicate that the identifier is allocated for the packet flow.

In an example, the method further includes storing, by the network device in a first data structure, first information indicating an allocation of the pool for packet flows between the first network and the second computing resource, the first data structure stored in a memory of the network device, and storing, by the network device in a second data structure, second information indicating an allocation of the identifier for the packet flow, the second data structure stored in the memory of the network device.

In an example, the method further includes storing, by the network device in one or more data structures, information indicating allocations of first identifiers from the pool to packet flows and a mapping of the first identifiers to corresponding NAT information, and determining, by the network device, NAT information mapped to the identifier based on the one or more data structures. The NAT operation is performed based on the NAT information.

In an example, determining that no identifier has been allocated for the packet flow includes a first lookup of a first data structure that is stored in a memory of the network device and that indicates identifiers that have been allocated for packet flows. Determining the identifier available to allocate for the packet flow includes a second lookup of a second data structure that is stored in the memory and that indicates an allocable sequence of available identifiers from the pool. The second lookup indicates that the identifier is the next available identifier according to the allocable sequence. Determining the identifier also includes: selecting, by the network device, the identifier based on the identifier being the next available identifier according to the allocable sequence, sending, by the network device to a database, an indication that the identifier is selected for allocation to the packet flow, and receiving, by the network device from the database, an indication that the identifier is allocable. The database maintains information about identifiers allocated for packet flows processed by a plurality of network devices, the plurality of network devices including the network device receiving the packet. Determining the identifier also or alternatively includes: selecting, by the network device, a different identifier based on the different identifier being the next available identifier according to the allocable sequence, sending, by the network device to a database, an indication that the identifier is selected for allocation to the packet flow, receiving, by the network device from the database, an error message indicating the different identifier is not allocable and indicating that the identifier is allocable, and removing, by the network device, the identifier and adding back the different identifier from the second data structure. Additionally, determining the identifier further includes selecting, by the network device, a different identifier based on the different identifier being the next available identifier according to the allocable sequence, sending, by the network device to a database, an indication that the identifier is selected for allocation to the packet flow, and receiving, by the network device from the database, an error message indicating the packet flow has already been mapped to the identifier.

In an example, the present disclosure relates to a network device including one or more processors, and one or more memories storing computer-readable instructions that upon execution by the one or more processors, configure the network device to perform operations. The operations include receiving a packet that includes a header. The header indicates a source address of a first computing resource in a first network and a destination address of a second computing resource in a second network. The operations also include determining a pool of identifiers allocated for the first network and the second computing resource. The operations also include identifying a packet flow based on the header. The operations also include determining that no identifier from the pool of identifiers has been allocated for the packet flow The operations also include determining an identifier available to allocate for the packet flow from the pool of identifiers. The operations also include performing a network address translation (NAT) operation on the packet based on the identifier. Performing the NAT operation includes replacing at least a portion of the header of the packet with the identifier.

In an example, the identifier is determined by at least determining, based on a lookup of a database, that the identifier is allocable to the packet flow. The database maintains information about identifiers allocated for packet flows processed by a plurality of network devices, the plurality of network devices including the network device receiving the packet. The execution of the computer-readable instructions further configures the network device to perform operations that include synchronizing a first data structure stored in a memory of the network device with a second data structure stored in the database. The second data structure includes the information about the identifiers allocated for the packet flows.

In an example, the execution of the computer-readable instructions further configures the network device to perform operations that include storing, in a first ring buffer, available pools and a first allocation sequence of the available pools, and storing, in a first data structure, first information indicating a first allocation of the pool from the available pools for the first network and the second computing resource. The first allocation is based on the first allocation sequence. The operations also include storing, in a second ring buffer, available identifiers from the pool and a second allocation sequence of the available identifier, and storing, in a second data structure, second information indicating a second allocation of identifier for the packet flow. The second allocation is based on the second allocation sequence.

In an example, the present disclosure relates to a system that includes a first network device. The first network device includes first one or more processors, and first one or more memories storing first computer-readable instructions that upon execution by the first one or more processors, configure the first network device to perform first operations. The first operations include receiving a first packet that includes a first header. The first header indicates a source address of a first computing resource in a first network and a destination address of a second computing resource in a second network. The first operations also include determining a pool of identifiers allocated for the first network and the second computing resource. The first operations also include identifying a packet flow based on the first header. The first operations also include determining that no identifier from the pool of identifiers has been allocated for the packet flow. The first operations also include determining an identifier available to allocate for the packet flow from the pool of identifiers. The first operations also include performing a first network address translation (NAT) operation on the first packet based on the identifier. Performing the first NAT operation includes replacing at least a portion of the first header of the first packet with the identifier.

In an example, the system also includes a second network device. The second network device includes second one or more processors, and second one or more memories storing second computer-readable instructions that upon execution by the second one or more processors, configure the second network device to perform second operations. The second operations include receiving a second packet that includes a second header. The second header indicates the source address of the first computing resource and the destination address of the second computing resource. The second operations also include identifying the packet flow based on the second header. The second operations also include determining, based on a database, that the identifier has been allocated for the packet flow. The database is communicatively coupled with the first network device and the second network device. The second operations also include performing a second NAT operation on the second packet based on the identifier.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples are described in detail below with reference to the following figures.

FIG. 13 illustrates an example of a trace of execution of allocate/free/mark operations using an indexed array to implement an associative array according to certain embodiments.

DETAILED DESCRIPTION

Figure 1:
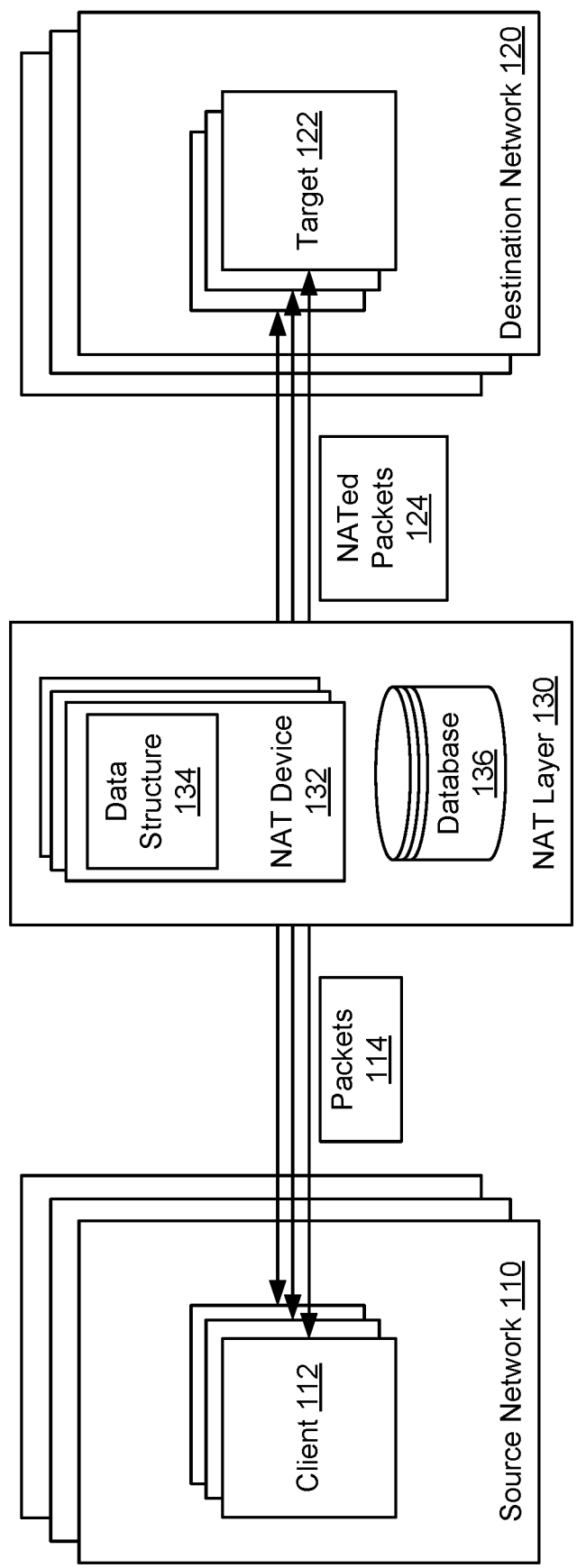
FIG. 1 illustrates an example computer environment, where NAT operations are performed according to certain embodiments.

The present disclosure relates to network communications, and more particularly to techniques for performing network address translation (NAT) for sending packets between networks.

In an example, packets originating at a client on a first network and destined for a target on a second network may flow through a first NAT device of a NAT layer. The NAT layer can include multiple NAT devices connected between the two networks, such as routers, gateways, host machines, or other devices that perform NAT operations. A NAT operation can include translation of header information of a packet such that the packet can flow between the networks. For instance, the first NAT device receives a packet originating at the client, where the header of the packet includes the client's private internet protocol (IP) address and port address as a source IP address and a source port, respectively. The first NAT devices translates this information into a NAT IP address and a NAT port, updates the header to include NAT information (e.g., NAT IP address and NAT port), and routes the packet forward to the target. Thereafter, the first NAT device receives a response packet back originating at the target, where the header of this packet includes the NAT IP address and the NAT port as a destination address and a destination port, respectively. Here, the first NAT device translates the NAT IP address and NAT port back into the client's private IP address and port before routing the response packet forward to the client.

Generally, multiple packet flows may be processed by a NAT device. The NAT device may also reboot over time and continue the processing of one or more of the packet flows. In addition, the processing of a packet flow may change from a NAT device to another one. For proper NAT processing, there is a need that each packet flow is uniquely identified and the relevant NAT information is used in the processing thereof. Otherwise, the NAT processing of a packet flow would become inconsistent over time.

To illustrate and referring back to the first NAT device above, multiple packet flows to the target may simultaneously exist and may be processed by the first NAT device. The first NAT device needs to determine that the packet flows are different. Otherwise, the first NAT device may incorrectly use the same NAT information for different packet flows.

Furthermore, while the packet flow is established between the client and the target, the first NAT device may reboot at some point in time. In this case, upon completion of the reboot, the first NAT device needs to determine that the packet flow was already established, rather than being a new packet flow that was not previously processed by the first NAT device. The first NAT device further needs to determine and re-use the relevant NAT information applicable to the packet flow (e.g., the correspondence between the client's private IP address and NAT IP address and the correspondence between the client's port and the NAT port). Otherwise, the first NAT device incorrectly determines that a different packet flow exists after the reboot and/or uses inconsistent NAT information before and after the reboot.

Additionally or alternatively, at some point in time, the processing of the packet flow may change from the first NAT device to a second NAT device of the NAT layer. In this case, the second NAT devices needs to re-use the same NAT information that the first NAT device was using. Otherwise, inconsistent NAT information is used for the same packet flow.

Further, the client may stop sending packets to the target for a certain time duration, resulting in the termination of the packet flow. In this case, the first NAT device (or, as applicable, the second NAT device), can release or all of the NAT information (e.g., the NAT port that was used for this packet flow) for use in the processing of packets of a new packet flow. However, this new use needs to be delayed as much as possible. Otherwise, NAT devices may incorrectly determine that the new packet flow is the same as the now-terminated packet flow.

In order to meet the above needs, the first NAT device uses one or more data structures to allocate, from a pool of identifies, an identifier to the packet flow between the client and the target. The identifier can be unique to the packet flow and can be used to determine the relevant NAT information for use in the processing of packets of the packet flow. The allocation can rely on a centralized database that maintains data about how identifiers are allocated to packet flows and relevant NAT information for persistent use by a NAT device (e.g., before and after a reboot) and for consistent use across multiple NAT devices (e.g., to support the change of the flow processing between NAT devices).

In particular, the first NAT device receives a packet, determines the packet flow based on the packet's header (e.g., based on a 5-tuple included in the header), and determines whether an identifier has already been allocated to this packet flow. If so, the first NAT device determines, based on the identifier, the relevant NAT information to use in the processing of the headers. If not, the first NAT device allocates an identifier from the pool, where the allocation and the associated NAT information are synchronized with the centralized database.

Upon a reboot, the first NAT device continues receiving and processing packets of the packet flow. In this case, the first NAT device determines the identifier from the centralized database and continues using it and the associated NAT information after the reboot.

Additionally, upon the packet flow changing to the second NAT device, the second NAT device retrieves the identifier and the NAT information from the centralized database for its processing of the headers.

When the first NAT device determines that the packet flow has been terminated, it releases the identifier back to the pool of identifiers. The data structure(s) delays the re-use of the identifier for a new packet flow as much as possible, while also enabling a selective re-use of the identifier as an exception to the delay. For instance, the data structure(s) includes a first input first output (FIFO) queue. These and other aspects of the present disclosure are further described in connection with the next figures.

As used herein, a client refers to a device on a network. The client can be a physical device or a virtual device hosted on a physical device (e.g., a compute instance executing on a host machine). A target refers to a device on a network, where this device is accessible to a client. Here also, the target can be a physical device or a virtual device hosted on a physical device. A NAT device refers to a device (whether physical or virtual) that processes a packet, where the processing includes a NAT operation. The NAT device can be a modem, a router, a gateway, a host machine, or any other device suitable for such packet processing. A NAT layer refers to a set of NAT devices communicatively coupled with at least one network that includes client(s) and/or target(s). The NAT layer can be a bridge layer between multiple networks, where this bridge layer supports flows of packets between the networks. A source network refers to a network that includes a set of clients. A destination network refers to a network that includes a set of targets. A data structure refers to a structure that stores data usable for NAT processing, where this structure is stored locally in system memory of a NAT device, such as a high speed cache of the system memory. A centralized database refers to a database that is accessible to multiple NAT devices and that stores data entries usable by the NAT device.

FIG. 1 illustrates an example computer environment, where NAT operations are performed. As illustrated, the computer environment includes multiple networks, such as a source network 110, a destination network 120, and a NAT layer 130 that is coupled directly or indirectly between the networks. Clients on source networks may communicate with targets on destination networks. The communications may include flows of packets between the clients and the targets. The packets may be processed by NAT devices of the NAT layer 130. In the interest of clarity of explanation, FIG. 1 is described in connection with a communication between a client 112 on the source network 110 and a target 122 on the destination network 120, where the packets of this flow are processed by a NAT device 132 of the NAT layer 130. However, the present disclosure similarly applies to communications of multiple clients on the source network 110 with the target 122, communications of the client 112 with multiple targets on the destination network 120, and communications between any number of clients on any number of source networks and any number of targets on any number of destination networks, where one or more NAT devices of the NAT layer 130 may process the packet flows.

The packet flow between the client 112 and the target 122 can be bidirectional (e.g., includes a forward flow of packets sent from the client 112 to the target 122, and a reverse flow of packets, such as responses, from the target 122 to the client 112). Alternatively, the packet flow can be one-directional (e.g., in case of a broadcast or a multicast from the client 112). Further, the packet flow can rely on a connection-oriented protocol between the client 112 and the target 122 (e.g., a transmission control protocol (TCP)) or a connectionless protocol (e.g., a user datagram protocol (UDP)).

The source network 110 can be a private network of an operator (e.g., a customer of a cloud service provider (CSP)). In an example, the source network 110 is a virtual network hosted on a substrate network (e.g., a virtual cloud network (VCN) hosted on a cloud infrastructure of the CSP).

In another example, the source network 110 is a substrate network. In comparison, the destination network 120 can be a private network of the same operator or a different operator, or can be a public network. Here also, the private network and/or the public network can be a virtual network or a substrate network.

The NAT layer 130 can be part of a network infrastructure between the source network 110 and the destination network 120. Generally, the NAT layer 130 provides a NAT service to the packet flows between the two networks 110 and 120. For instance, upon receiving packets 114 sent by the client 112 to the target 122 on the forward flow, the NAT layer 130 performs NAT operations on these packets 114, resulting in NATed packets 124 that are sent to the target 122. The NAT operations may include updating the source IP address and source port to a NAT IP address and a NAT port, respectively. Conversely, upon receiving packets from the target 122 destined to the client 112 on the reverse flow, the NAT layer 130 performs de-NAT operations on these packets before sending them to the client 112. The de-NAT operations may include updating the destination IP address and destination port (which are the NAT IP address and the NAT port, respectively) to the IP address and port, respectively, of the client 112.

The NAT operations on both the forward flow and the reverse flow can be performed by the NAT device 132 of the NAT layer 130, or by a different NAT device of the NAT layer 130 (e.g., the NAT operations on the forward flow can be performed by the NAT device 132 and the de-NAT operations on the reverse flow can be performed by another NAT device). Generally, a NAT device can be a network node that receives a packet, performs a NAT operation on the packet and can send the processed packet to a next network hop. In a particular illustration, and referring to the example where each of the source network 110 and the destination network 120 is a VCN, the NAT device can be a host machine from a fleet of host machines, where this host machine hosts a virtual router.

As further illustrated in FIG. 1, the NAT device 132 stores a data structure 134 (e.g., in its high speed cache). The data structure 134 is usable to allocate an identifier from a pool of identifiers to the flow between the client 112 and the target 122. Upon the termination of the flow, the data structure 134 is also usable to release the identifier back to the pool. The re-use of the identifier for a new flow can be delayed based on the data structure 134. The data structure 134 also supports a selective re-use of the identifier.

The NAT layer 130 also includes a database 136. The database 136 is usable to maintain the allocation of the identifiers across the NAT devices and can be referred to as a centralized database because it is accessible to and usable by multiple NAT devices. If the NAT device 132 needs to allocate an identifier to the flow between the client 112 and the target 122, the database 136 is usable to determine whether the identifier is allocable or whether another identifier has already been allocated and should be re-used instead. In this way, the use of identifiers can be persistent over time and synchronized across the different NAT devices. Examples of the data structure 134 and the database 136 are further described in the next figures.

An identifier allocated to the flow between the client 112 and the target 122 is usable to determine the NAT information (e.g., the correspondence between a client's IP address and NAT IP address and between a client's port and the NAT port) to use in NAT operation applicable on the forward flow and the reverse flow. In an example, the identifier includes a NAT port to use, a NAT IP address to use, or a combination of the NAT port and NAT IP address. For instance, the identifier can be a new (e.g., NATed) "source port" that is to replace the original source port in the packet when received by the NAT device 132. The identifier can be a new (e.g., NATed) "source port, source IP address" combination that is to replace the original source port and the original source IP address in the packet when received by the NAT device 132. Or, the identifier can be a new (e.g., NATed) "source IP address" that is to replace the original source IP address in the packet when received by the NAT device 132.

To illustrate, consider the example of a pool of NAT ports usable for all packets sent from the source network 110 (including originating from the client 112 and other clients of the source network 110) to the target 122. Here, the NAT port is an example of the identifier. The NAT device 132 receives a packet sent from the client 112 and identifies the flow based on the packet header (e.g., the source IP address, the source port, the destination IP address, the destination port, and the protocol). Next, the NAT device 132 determines whether a NAT port has been allocated to the flow. If so, the NAT port is used in the NAT operation before the processed packet is sent to the target 122. If no NAT port has been allocated, the NAT device 132 allocates, by using the data structure 134, a NAT port from the pool. The NAT device 132 checks with the database 136 whether this allocation is proper. If so, the NAT device 132 proceeds to perform the NAT operation by using the NAT port. Otherwise, the NAT device 132 is notified about the proper NAT port to use and, accordingly, uses this port in its NAT operation. These and other operations are further described in the next figures.

Figure 2:
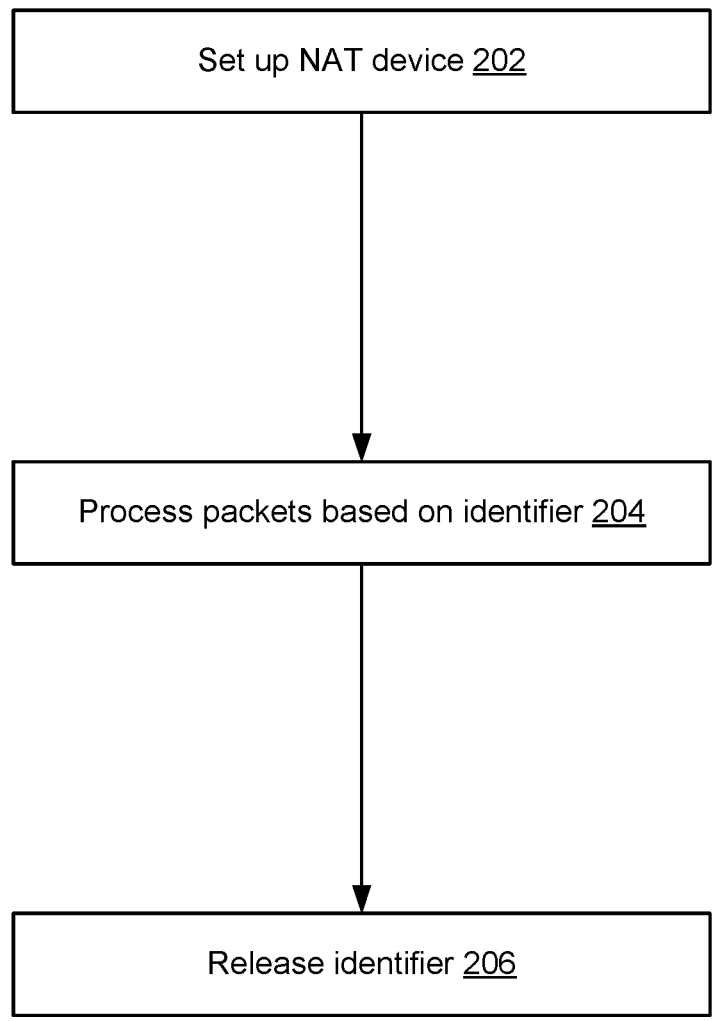
FIG. 2 illustrates an example of a method for processing of packets by a NAT device according to certain embodiments.

FIG. 2 illustrates an example of a method for processing of packets by a NAT device, such as the NAT device 132 of FIG. 1. Some or all of the instructions for performing the operations can be implemented as hardware circuitry and/or stored as computer-readable instructions on a non-transitory computer-readable medium of the NAT device. As implemented, the instructions represent software or code executable by one or more processors of the NAT device. The execution of such instructions configures the NAT device to perform the specific operations described herein. Each circuitry or code, in combination with the relevant processor(s), represents a means for performing a respective operation(s). While the operations are illustrated in a particular order, it should be understood that no particular order is necessary and that one or more operations may be omitted, skipped, performed in parallel, and/or reordered.

The method may start at operation 202, where the NAT device is set up. In an example, the setup includes establishing a connection to a database (e.g., the database 136 of FIG. 1) and synchronizing one or more data structures stored locally by the NAT device with data entries of the database. Further, the setup may include allocating pools of identifiers, where each pool can be allocated to a source network or to a combination of a source network and a target. Once a pool is allocated, identifiers from the pool become available for allocations to packet flows associated with clients on a source network and, as applicable, a target. The setup may also include signaling the NAT device's availability to begin processing packets. For instance, a BGP route that uses an anycast IP address is advertised.

At operation 204, the NAT device processes a packet of a packet flow. The processing relies on an identifier that is allocated to the packet flow from a pool of identifiers. In an example, the packet flow can be between a client on a source network and a target on a destination network. The pool is already allocated to the source network and, as applicable, to the target. One or more NAT IP addresses are usable for the packet flow (e.g., they can be specified by a control plane, as further described in the next figure). Additionally or alternatively, one or more NAT ports are usable for the packet flow (e.g., also can be specified by the control plane). The NAT device determines whether the packet flow is already established (e.g., being processed by the NAT device) or new (not already being processed by the NAT device). If already established, the NAT device determines, from its data structure(s), the identifier that is already allocated from the pool to the packet flow and the NAT information specifically associated with the identifier (e.g., the NAT IP address and NAT port to use). Otherwise, the NAT device selects the identifier from the pool (e.g., as the identifier at the header of a FIFO queue) and checks, based on a request to the database, whether the identifier can be allocated to the packet flow. If so, the NAT device allocates the identifier to the packet flow, and the database updates its data entries accordingly. Otherwise, the NAT device receives, from the database, the identifier to use, allocates this identifier to the packet flow, and updates its data structure(s) (e.g., removes it from the FIFO queue). The NAT device also determines the NAT information associated with the identifier (e.g., by requesting it from the database, by selecting a NAT IP address and a NAT port and updating the database, or determining this information based on the identifier itself in the case where the identifier includes one or both of the NAT IP address and NAT port). Thereafter, the NAT information is used in the processing of the packet, whereby the header of the packet is updated.

At operation 206, the NAT device releases the identifier. In an example, the NAT device determines that the client has not sent any packet to the target for a certain time duration. Accordingly, the NAT device determines that the packet flow has been inactive for the time duration and updates its data structure(s) to indicate that the identifier and associated NAT information can be used for a subsequently established packet flow. For instance, the NAT device adds the identifier to the pool (e.g., by adding it at a tail position of the FIFO queue) and deletes the NAT information. Further, the NAT device indicates, to the database, that the identifier has been released. In response, the database updates its data entries.

Figure 3:
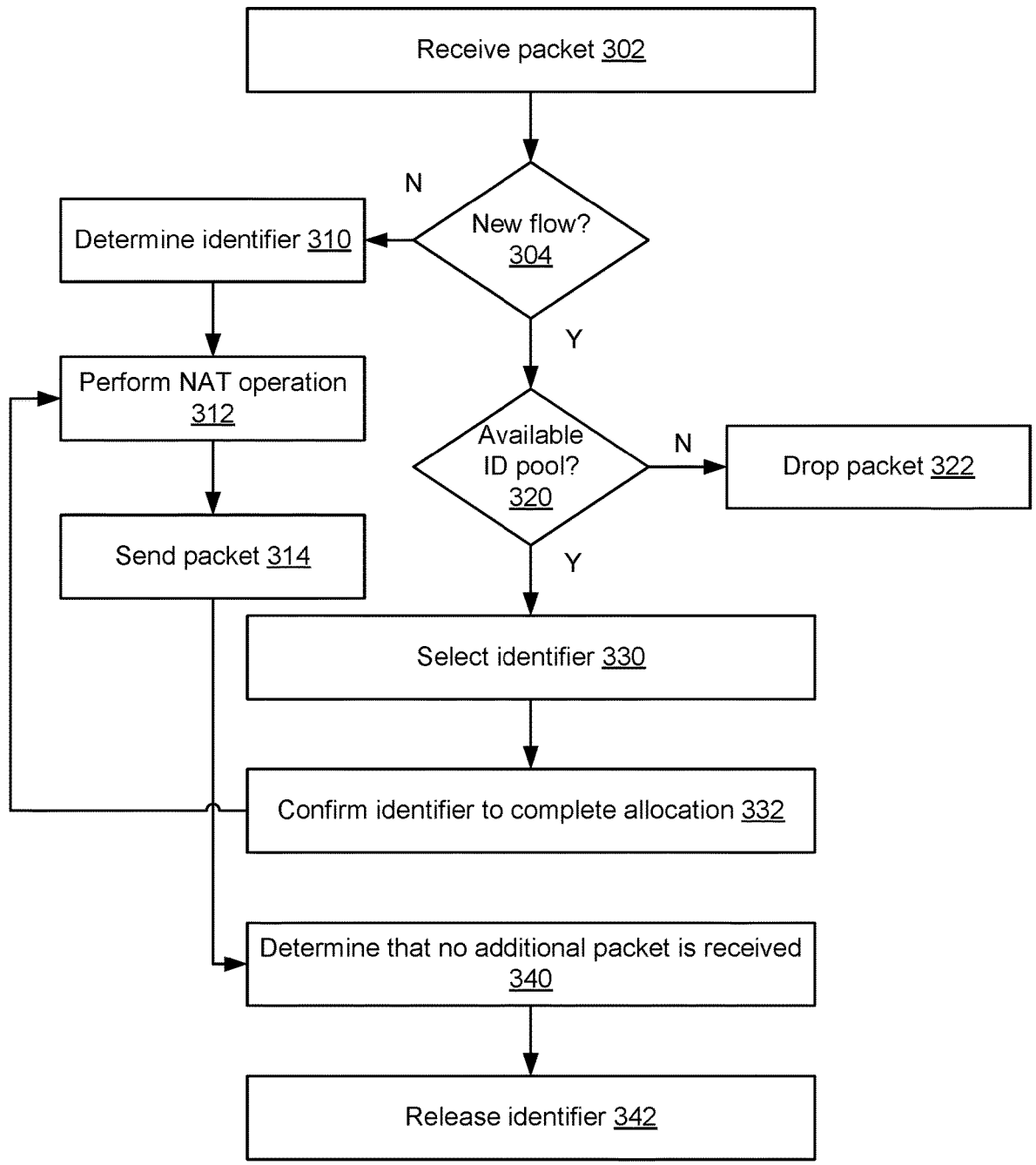
FIG. 3 illustrates an example of a method for performing NAT operations based on an identifier allocated to a flow between a client on source network and a target on a source network according to certain embodiments.

FIG. 3 illustrates an example of a method for performing NAT operations based on an identifier allocated to a flow between a client on source network and a target on a source network. Operations of this method can be implemented as sub-operations of operation 202 of FIG. 2. The method may be performed by a NAT device, such as the NAT device 132 of FIG. 1. Some or all of the instructions for performing the operations can be implemented as hardware circuitry and/or stored as computer-readable instructions on a non-transitory computer-readable medium of the NAT device. As implemented, the instructions represent software or code executable by one or more processors of the NAT device. The execution of such instructions configures the NAT device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

At operation 302, the NAT device receives a packet. The packet can be sent from a client on a source network to a target on a destination network (e.g., the packet is received in the forward flow). Alternatively, the received packet can be a response from the target to the client (e.g., is received in the reverse flow). On both the forward and reverse flows, the packet's header includes a 5-tuple that can identify the corresponding flow. In particular, on the forward flow, the 5-tuple includes the IP address of the client as a source IP address, the port of the client as a source port, the IP address of the target (as known to the client) as the destination IP address, the port of the target (also as known to the client) as the destination port, and a protocol. The header can include other information, such as a network tag that identifies the source network. On the reverse flow, the 5-tuple includes the IP address of the target as a source IP address, the port of the target as a source port, the IP address of the client (e.g., the NAT IP address as known to the target) as the destination IP address, the port of the client (the NAT port as known to the target) as the destination port, and the protocol. The header can include other information, such as a network tag that identifies the destination network.

At operation 304, the NAT device determines whether the flow is already established (e.g., being processed by the NAT device) or new (not already being processed by the NAT device). For instance, the NAT device identifies the flow from the 5-tuple of the header in the packet. The identification can include a hash of the 5-tuple (or a portion thereof). This identification is compared to identifiers of flows processed by the NAT device. If there is a match, then the match indicates an already established flow, and the method proceeds to operation 310. Otherwise, this flow is new, and the method proceeds to operation 320.

At operation 310, the NAT device determines an identifier from the pool of identifiers, where this identifier has been previously allocated to the flow. For example, the identifier can be any or a combination of a NAT port or a NAT source IP address. The previous allocation involves storing the allocated identifier, the packet flow identification (e.g., the hash), and an association therebetween in a first data structure of the NAT device (e.g., a table in a high speed cache of the NAT device). This already allocated identifier can be determined from the first data structure based on the packet flow identification.

At operation 312, the NAT device performs a NAT operation on the packet based on the identifier. For instance, to send the packet to the target, the NAT device replaces the source IP address and source port with the NAT IP address and NAT port, respectively. Conversely, to send the packet to the client, the NAT device replaces the NAT IP address and NAT port with the client's IP address and port, respectively. Other NAT operations can be further performed, such as replacing the network tag that identifies the source network with another one that identifies the source network on the forward flow, replacing the network tag that identifies the source network with another one that identifies the source network on the reverse flow, adding or updating encapsulation information such that the packet can be properly sent on a substrate network, and the like.

At operation 314, the NAT device sends the packet. For instance, upon performing the NAT operation(s), the processed packet is sent to the next network hop for routing to the target (on the forward flow) or the client (on the reverse flow).

At operation 320, the NAT device has determined that the flow is new and, accordingly, determines whether a pool of identifiers is available, from which an identifier can be allocated to the flow. Generally, multiple pools of identifiers can be available and are indicated in a second data structure of the NAT device (e.g., a FIFO queue that is stored in a high speed cache of the NAT device and that tracks a sequence for allocating the available pools). A pool can be allocated to the source network (e.g., by using the network tag) or to a combination of the source network and the target (e.g., this combination also uses the IP address of the target). The allocation can be indicated in the second data structure or in a third data structure (e.g., a table that associates the pool with the source network, and as applicable, the target). If a pool has been allocated, identifiers that are available from the pool can be allocated to flows between the source network and the target. Accordingly, at operation 320, the NAT device uses the network tag and, as applicable, the IP address of the target to determine whether a pool of identifiers has already been allocated for use. If not, operation 322 is performed, where the NAT device drops the packet because no pool of identifiers has already been allocated. Otherwise, operation 330 is performed to further allocate an identifier from this pool.

At operation 330, the NAT device has determined that the flow is new and that a pool of identifiers is available for this flow, and, accordingly, selects an identifier (e.g., a NAT port and/or a NAT IP address) to allocate to this new flow. The selection can be based on information stored in a fourth data structure of the NAT device (e.g., another FIFO queue that is stored in a high speed cache of the NAT device and that tracks a sequence for allocating the available identifiers of the pool determined at operation 320). For instance, the NAT device selects the next available identifier based on the allocation sequence maintained by the fourth data structure. In certain situations, rather than selecting the next available identifier, information may be received by the NAT device, where this information indicates a particular identifier is to be used/allocated for the flow. Information identifying the particular identifier may be based on customer input or may be set in configuration information for the NAT device. In such a scenario, the particular identifier, if available, is selected.

At operation 332, the NAT device checks that the selected identifier can be allocated. This check can be based on the database. For instance, the NAT device sends a request to the database that includes the identifier (e.g., a NAT port and/or a NAT IP address) and that identifies the flow (e.g., the hash of the 5-tuple). If allocable, the database responds that the identifier can be allocated and updates its entries to indicate that the identifier is allocated to the flow. If it cannot be allocated, the database responds with a different identifier that the NAT device should use, where this different identifier is already associated with the flow in an entry of the database. In both cases, the NAT device updates its fourth data structure to indicate the identifier that should be used for this flow. Thereafter, the packet can be processed and sent as indicated with the loop to operation 312. This database check may be performed such that identifiers can be persistently used by the NAT device (e.g., upon a reboot) or consistently between NAT devices (e.g., if the flow was processed by another NAT device and the processing changed to the NAT device). Once the packet is sent, the NAT device resets a timer that tracks the activity of the flow.

At operation 340, the NAT device determines that no additional packet is received in the flow for a certain time duration (e.g., a few seconds, a few minutes, a few hours, or some other predefined time duration). Because no additional packet is received, the NAT device determines that the flow has become inactive. For instance, upon a value of the timer reaching a predefined threshold (e.g., a few seconds, a few minutes, or few hours), the NAT device determines that the flow is now inactive.

At operation 342, the NAT device releases the identifier back to the pool of identifiers. The release allows the identifier to be used for a new flow. For instance, the fourth data structure is updated to indicate that the identifier has been released (e.g., the identifier is added at a tail position of the FIFO queue). The data structure supports a delayed new use or a selective new use.

In the interest of clarity of explanation, examples of the present disclosure are illustrated in the next figures and described in connection with a flow between a client and a target and the use of a NAT port (e.g., a NAT source port) as an identifier of the flow. However, the present disclosure is not limited as such. Instead, the present disclosure similarly applies to performing NAT operations on packet flows between any number of networks. The NAT operations can rely on other types of identifiers that are uniquely allocated from one or more pools of identifiers to the flows.

As explained herein above, a NAT device, such as a router, is connected between networks and performs NAT operations on packets sent between the networks. A NAT operation includes, for example, updating the header of a packet by replacing a source IP address and source port with a NAT address and a NAT port.

A NAT layer can exist between the networks, where the NAT layer includes multiple NAT devices. A NAT device may handle multiple connections. A connection can be between a "client" in a source network (e.g., a compute resource that establishes a connection) and a "target" in a destination network (e.g., another compute resource with which the connection is established).

As such, a NAT device may be handling multiple connections, each between a different pair of (client, target). A few challenges arise in such a computing environment. First, the NAT device needs to uniquely identify each connection, such that the NAT information it uses for that connection is consistent over time (e.g., the same NAT IP address and NAT port are used over time for a connection between "Client A" and "Target B"). Second, while handling a connection, the NAT device may reboot. After the reboot, the NAT device needs to continue handling the connection by consistently re-using the same NAT information it was using before the reboot. Third, the handling of the connection may switch from the NAT device to a second NAT device, where subsequent packets would be processed by the second NAT device. In this case, the second NAT device also needs to use the same NAT information that the NAT device was using prior to the switch (e.g., the same NAT IP address and NAT port for the connection between "Client A" and "Target B"). Fourth, the connection may terminate at some point in time. The NAT device (or, as applicable, the second NAT device) needs to release the NAT information for re-use in the processing of another connection (e.g., a connection that is established after the termination between "Client X" and "Target Y"). The release is important because, for instance, there may be a limited number of usable NAT IP addresses and NAT ports. However, after the release, the re-use of the NAT information needs to be delayed as much as possible. Otherwise, the other connection (e.g., between "Client X" and "Target Y") can be incorrectly determined to be the same as the now-terminated connection (e.g., between "Client A" and "Target B").

In order for a NAT device to uniquely identify a connection between a client and a target, and consistently and persistently use the corresponding NAT information, the following elements can be implemented.

A pool of identifiers (IDs) from which an ID can be allocated to a connection and used to identify the connection and determine the corresponding identifier.

Multiple pools from which the pool of IDs can be allocated to either (i) a source network (e.g., one including multiple clients) or (ii) a pair of (source network, target). In the above bullet, an ID can be allocated from the pool if the connection is from a client in the source network (as in (i) only) and, as applicable, to the target (as in (ii)).

Data structures that are stored locally in a system memory (e.g., cache) of the NAT device. The data structures identify (i) the pools, their allocations, and for the ones that have not been allocated, an order in which these available pools can be allocated; (ii) the pool, the allocation of IDs from the pool, and for the IDs that have not been allocated, an order in which these available IDs can be allocated; (iii) a mapping of allocated IDs to corresponding NAT information to use.

A centralized database that is accessible to each NAT device and that stores the various allocations. Upon a start or reboot, a NAT device synchronizes its data structures with the centralized database. Upon an allocation of an ID from a pool, the NAT device coordinates the allocation with the centralized database. Upon a switch to a second NAT device for handling a connection that was handled by the NAT device, the second NAT devices checks with the centralized database to determine the ID that is already allocated to this connection.

In light of the above, consider an illustrative example. A source network is a first virtual cloud network (VCN) and includes a compute instance (referred to herein as a client). A destination network is a second VCN and includes a compute instance accessible to compute instances of the first VCN (referred to herein as a target). A NAT device, such as a router, processes packets sent from the client to the target, where the processing involves updating packet headers to include a NAT IP address instead of the client's private IP address, and a NAT port instead of the client's port.

The NAT device stores two pools of IDs. Each pool includes 64,000 NAT ports (IDs here are NAT ports).

The tool pools are stored in a first circular buffer (or some other FIFO queue). Next, the first pool is allocated to the first VCN, for any connection established by a client in the first VCN, a NAT port will be allocated from the 64,000 ports in the first pool. The first pool is allocated because it is at the header location in the first circular buffer. Once allocated, a first table (or an array) is updated to indicate that this pool is allocated to the first VCN. This table is also stored in the system memory of the NAT device.

The NAT device also includes a second circular buffer (or some other FIFO queue). This circular buffer stores the NAT ports that can be allocated from the first pool. The positions of the NAT ports in the second circular buffer indicate the order in which the NAT ports can be allocated. Upon an allocation of a NAT port, this NAT port is removed from the second circular buffer. A second table (or an array) is updated to indicate that the NAT port has been allocated to a connection. Upon a termination of the connection, the NAT port is re-added to the second circular buffer, such as at its tail, to delay the re-use of the NAT port as much as possible. The second table is also updated to indicate that the NAT port is now allocable.

In operation, the NAT device receives a packet that includes a 5-tuple: an IP address and a port of a client, an IP address and a port of a target, and a protocol ID. The packet also includes a tag that identifies the first VCN. The following steps are performed:

Based on the tag and the first table, the NAT device determines if the a pool has been allocated to the first VCN.
If not, it drops the packet.
If so, the packet processing proceeds forward. Next, based on the 5-tuple (e.g., a hash thereof), the NAT device determines from the second table, if a NAT port has been allocated to the connection between the client and the target.
If so, the NAT device uses the NAT port in processing the packet header.
If not, the NAT device selects from the second circular buffer the next available NAT port (e.g., the one at the header position in the second circular buffer). The NAT device then checks with the centralized database whether the selected NAT port can be allocated.
If the selected NAT port can be allocated, the NAT device uses the NAT port in processing the packet header. The centralized database updates its data entries to indicate the allocation. The NAT device also removes the NAT port from the second circular buffer and updates the second table.
If the selected NAT port cannot be allocated, the centralized database responds with the allocable NAT port. The NAT device uses this NAT port instead in the processing the packet header, removes it from the second circular buffer and updates the second table.

Accordingly, upon receiving a packet of a client in a first network to be routed to a target in a second network, the following capabilities can be implemented for a NAT device in support of NAT processing:

determine whether a pool of IDs (e.g., a pool of NAT ports) has been allocated to the first network, or to a pair of (first network, target);
determine whether an ID (e.g., a NAT) port has been allocated to the connection between the client and the target;
select an ID (e.g., a NAT port) from an allocated pool, and check, with a centralized database, if the selected ID can be allocated to the connection;
based on the response of the centralized database, allocate an ID (e.g., a NAT port) to the connection; and
use the allocated ID (e.g., the allocated NAT port) in the NAT processing (e.g., replaced the client's port with the allocated NAT port).

The NAT device can also include the following data structures:

a first circular buffer (or a FIFO queue) that stores available pools of ID pools (e.g., pools of NAT port pools) and indicates an allocation sequence of the available pools;
a first table (or some array structure) that stores an allocation of a pool to a network or a pair of (the network, a target);
a second circular buffer (or a FIFO queue) that stores, for an allocated pool, available IDs (e.g., allocable NAT ports) and indicates an allocation sequence of the available IDs; and
a second table (or some array structure) that stores an allocation of an ID from the pool to a connection between a client in the network and the target.

Figure 4:
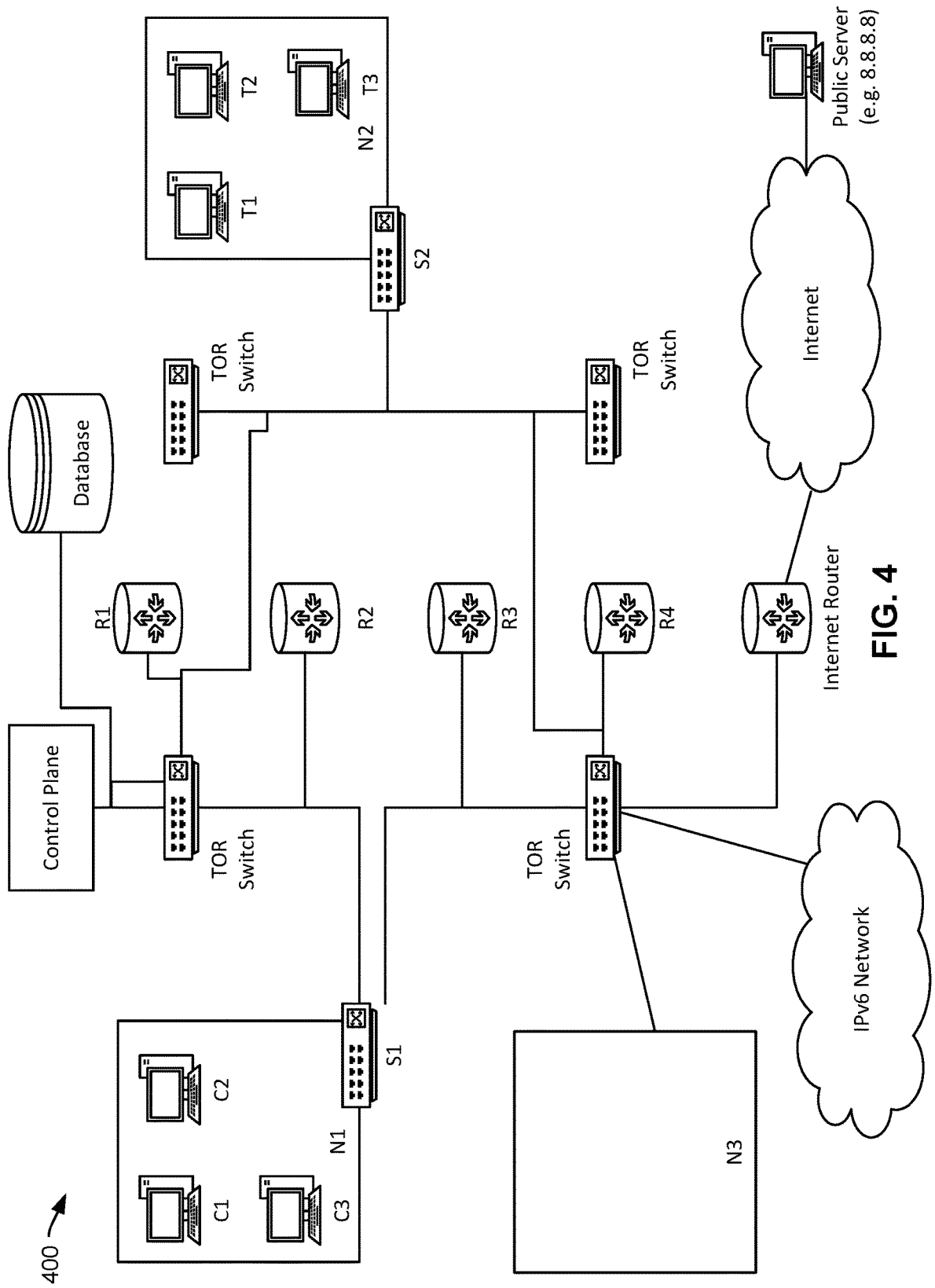
FIG. 4 illustrates an example computer environment that includes multiple networks according to certain embodiments.

FIG. 4 illustrates an example computer environment 400 that includes multiple networks. NAT operations are performed on packets sent between the networks. As illustrated, the computer environment 400 includes a first network N1, a second network N2, and a third network N3. Each of these three networks can be a private network, such as a VCN.

The first network N1 includes a plurality of clients C1, C2, and C3. Each client can be a compute instance executing on a host machine. Similarly, the second network N2 includes a plurality of targets T1, T2, and T3. Each target can also be a compute instance executing on a host machine. A switch S1 of the first network N1 connects the first network N1 (and its clients C1, C2, and C3) to a fleet of host machines through a set of top of the rack (TOR) switches. The host machines are in turn connected to a switch S2 of the second network via TOR switches. Each of the switches S1 and S2 can be a network virtualization device (NVD) that provides network switching functionalities. An example of the NVD is a smart network interface card (SmartNIC) available in the Oracle Cloud Infrastructure (OCI). The machine's network routing functionalities are illustrated as routers R1, R2, R3, and R4. The routers R1, R2, R3, and R4 perform NAT operations on the packets sent between the networks. A NAT operation is performed on a packet of a flow by a router dependently on a data structure that is stored by the router and that is usable to allocate or determine a NAT port for the flow in coordination with a centralized database. The centralized database can be coupled with the routers R1, R2, R3, and R4 via the TOR switches.

In addition, the computer environment 400 includes a control plane. The control plane can be a set of host machines coupled with the TOR switches and that provide control functionalities related to the networks N1, N2, N3 and/or the compute instances hosted thereat. The control functionalities include the distribution and update to configuration information applicable to the compute instances.

The application of NAT operations may not be limited to packet flows between the networks N1, N2, and N3 but can also extend to packet flows with public networks. As illustrated in FIG. 4, the computer environment 400 includes the internet, whereby an internet router is coupled with the TOR switches. Packets can be exchanged between, for instance, any of the clients C1, C2, and C3 and a public server that is available on the internet.

Figure 5:
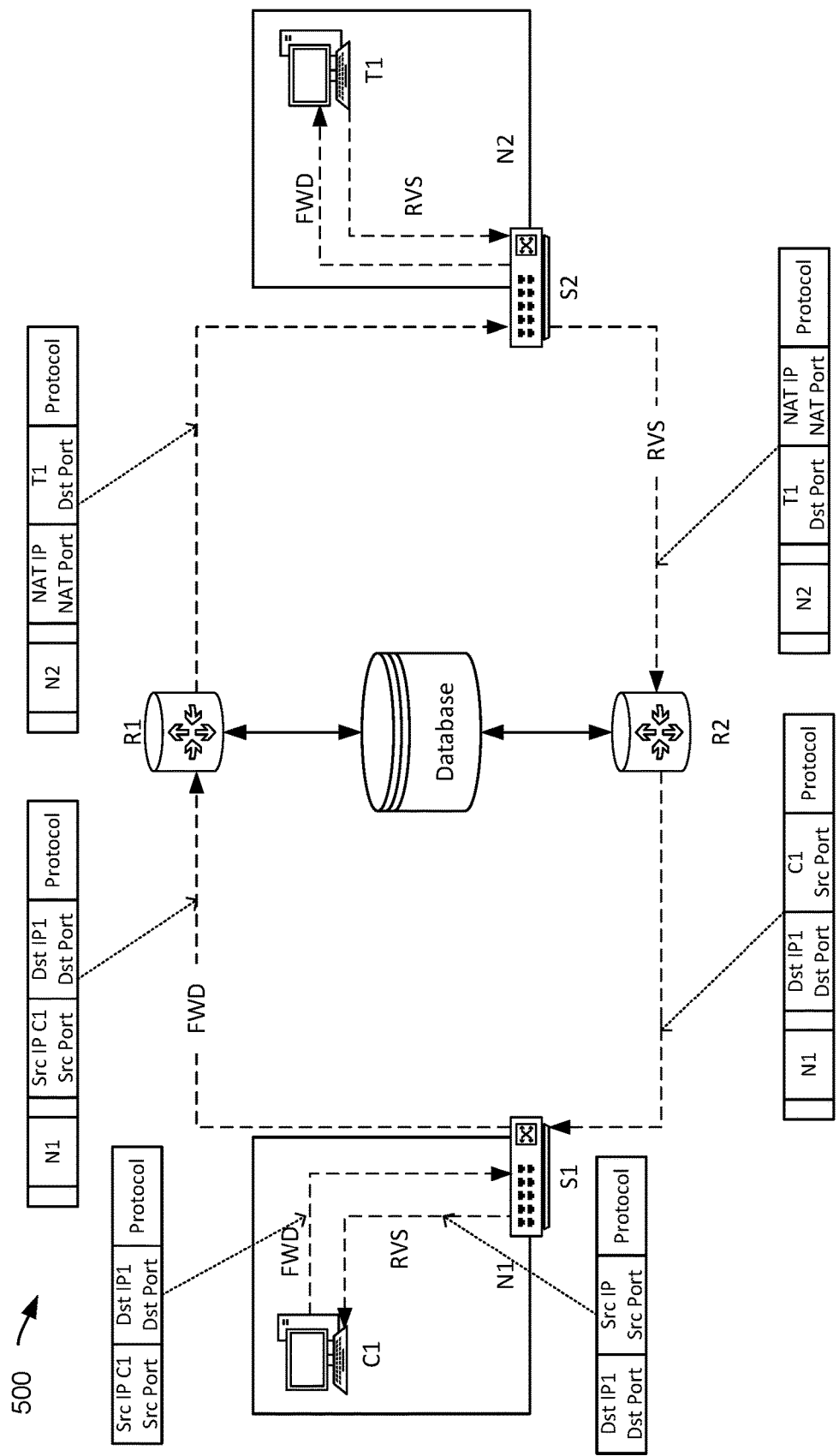
FIG. 5 illustrates an example computer environment that includes a forward flow from a client to a target and a reverse flow from the target to the client according to certain embodiments.

FIG. 5 illustrates an example computer environment 500 that includes a forward flow from a client to a target and a reverse flow from the target to the client. The computer environment 500 corresponds to a portion of the computer environment 400 of FIG. 4. In particular, the target T1 of the second network N2 is configured, via the control plane, for access to at least the client C1 of the first network N1.

In operation, the client C1 sends a packet to the target T1 and receives a response from the client T1 on a packet flow from the client C1 to the target T1. The packet is sent on the forward flow portion of the flow. The response packet is received on the reverse flow portion of the flow.

The original packet sent on the forward flow includes a 5-tuple: the IP address of the client C1 as a source IP address, the port of the client C1 as a source port, the IP address of the target T1 (as known to the client C1) as the destination IP address, the port of the target T1 (also as known to the client C1) as the destination port, and a protocol. The switch S1 processes this packet and adds encapsulation information to the header. The encapsulation information includes a network tag (shown as "N1") that identifies the first network N1. Based on a hash of the header and/or the 5-tuple, the router R1 is selected to process the packet sent by the switch S1. This and other similar hashes are used to distribute the processing of the packets across the routers R1, R2, R3, and R4 to achieve a desired distribution (e.g., a uniform distribution for load balancing).

The hash can also be used to select a packet processing thread from multiple packet processing threads of the router R1. The packet processing thread uses a data structure of the router R1 in coordination with the centralized database to determine the NAT port to use for the flow. Once determined, the packet processing thread updates the header of the packet to include a different 5-tuple: a NAT IP address of the client C1 as the source IP address, the NAT port as the source port, the IP address of the target T1 (e.g., its IP address within the subnet of the second network N2) as the destination IP address, the port of the target T1 as the destination port, and the protocol. The network tag "N1" is also replaced with the network tag "N2" to identify the second network N2. The processed packet is sent to the switch S2 of the second network N2.

In response, the target T1 sends a packet on the reverse flow to the switch S2 that then processes the packet and sends the processed packet. The packet sent from the switch S2 includes, in the header, the network tag "N2" of the second network N2 and a 5-tuple: the IP address of the target T1 (e.g., its IP address within the subnet of the second network N2) as a source IP address, the port of the target T1 as a source port, the NAT IP address of the client C1 as the destination IP address, the NAT port of the client C1 as the destination port, and the protocol. Based on a hash of the header and/or the 5-tuple, the router R2 is selected to process the packet sent by the switch S2. The hash can also be used to select a packet processing thread from multiple packet processing threads of the router R2. The packet processing thread uses a data structure of the router R2 in coordination with the centralized database to determine the correspondence of the NAT port with the port of the client C1. Once determined, the packet processing thread updates the header of the packet to include a different 5-tuple: the IP address of the target T1 (e.g., as known to the client C1) as the source IP address, the port of the target T1 (e.g., also as known to the client C1) as the source port, the IP address of the client C1 as the destination IP address, the port of the client C1 as the destination port, and the protocol. The network tag "N2" is also replaced with the network tag "N1" to identify the first network N1. The processed packet is sent to the switch S1 of the first network N1.

In an example, the routing device R1 (and possibly other devices like R2, for distributing load and/or high availability) is part of a bridging layer enabling connections between machine C1 in network N1 and machine T1 in network N2. (Alternatively, R1 and R2 could be processes on the same machine or different machines). Each of N1 and N2 could be private networks connected by a switch, or the public internet, or virtual overlay networks in a datacenter, or Virtual LAN networks, or other communication domain.

R1 is responsible for initially performing Network Address Translation of a flow F between C1 and T1, for which the first packet (or cell, or PDU, or frame, or request) of F arrives at R1. NAT may be needed for purposes of security, or for distinguishing between source identifiers from different private networks which might be from overlapping ranges. R1 assigns a unique identifier $I_F$ based on the source identifier (port number, IPv4 address and port number, IPv6 address, or ICWIP sequence number, or SCTP chunk number, or other identifier) in the first packet of the connection and rewrites one or more headers in the packet with this unique identifier, before forwarding the new packet to network N2 to ultimately reach machine T1. In some embodiments, this mapping of F to identifier $I_F$ needs to be communicated to R2 via a separate channel or a shared database (or a shared memory, in the case of processes), so that R2 can continue to use the same identifier for packets belonging to F (alternately R2 could redirect the packet to R1 based on a pre-established protocol utilizing inspection of packet details or identifier, or request identifier labels on-demand).

R1 needs to maintain in its memory (or registers, or cache, or other form of secondary storage, or hardware circuit) a finite pool P1 of identifiers that it can use for new connections (e.g., flows) from network N1. In other examples, R1 could maintain a separate pool of identifiers per network N1 and source IP address of a target, to enable a larger number of connections from N1. In some embodiments, R2 and other devices in the bridging layer may also need to assign identifiers from the same pool P1 for connections from N1.

In some examples, it is desirable to delay reuse of unique identifiers after release into P1 for reasons of security/robustness, to avoid mistaken identity of a connection on the receiving end, when the receiving application is not aware of the old connection getting broken.

In some examples, R1 includes software components running on several different threads (or processes/fibers/other independent units of execution) which may access pools independently and simultaneously without any prior synchronization. Additionally, R1 may learn of various networks N1, N2 . . . via a configuration or routing protocol or other means dynamically at various times. This is typically performed on a separate thread (or process or other execution unit), while the actual NAT translation is performed on a set of threads, referred to herein as packet processing threads. Occasionally, it can so happen that a full configuration refresh is triggered on R1, and it has to reload the entire list of networks. In high throughput applications, it is needed that the packet processing threads continue to execute without much delay in these situations.

In some examples, the device (or process) R1 is constrained in terms of memory usage relative to the large number of both networks $N_i$ and simultaneous active connections per network. In some examples, particularly on embedded devices, all memory is pre-allocated on R1 and only up to a fixed number of concurrent connections as well as networks is supported.

Typically R1 may implement a lease-based scheme for identifiers $I_F$, in conjunction with tracking the activity on connection F, with idle connections being considered inactive and their identifiers being released back into the pool after a preset time F. R1 may also perform connection tracking in the case of stateful protocols like TCP, in which case it releases identifiers upon receipt of a packet indicating connection termination. In case R1 learns from R2 (via shared channel or database) of an identifier $I_F$ being allocated by R2 for a connection, it needs to remove the identifier $I_F$ from consideration for future allocations.

Herein are disclosed techniques for keeping track of a dynamic set of pools P1, P2, . . . P1 corresponding to the various networks N1, N2, . . . N1, as well as allocating and releasing unique identifiers into each Pi. The techniques involve a data structure that can be realized in the form of hardware circuits/FPGA/carved-out sections in a process' address space.

Figure 6:
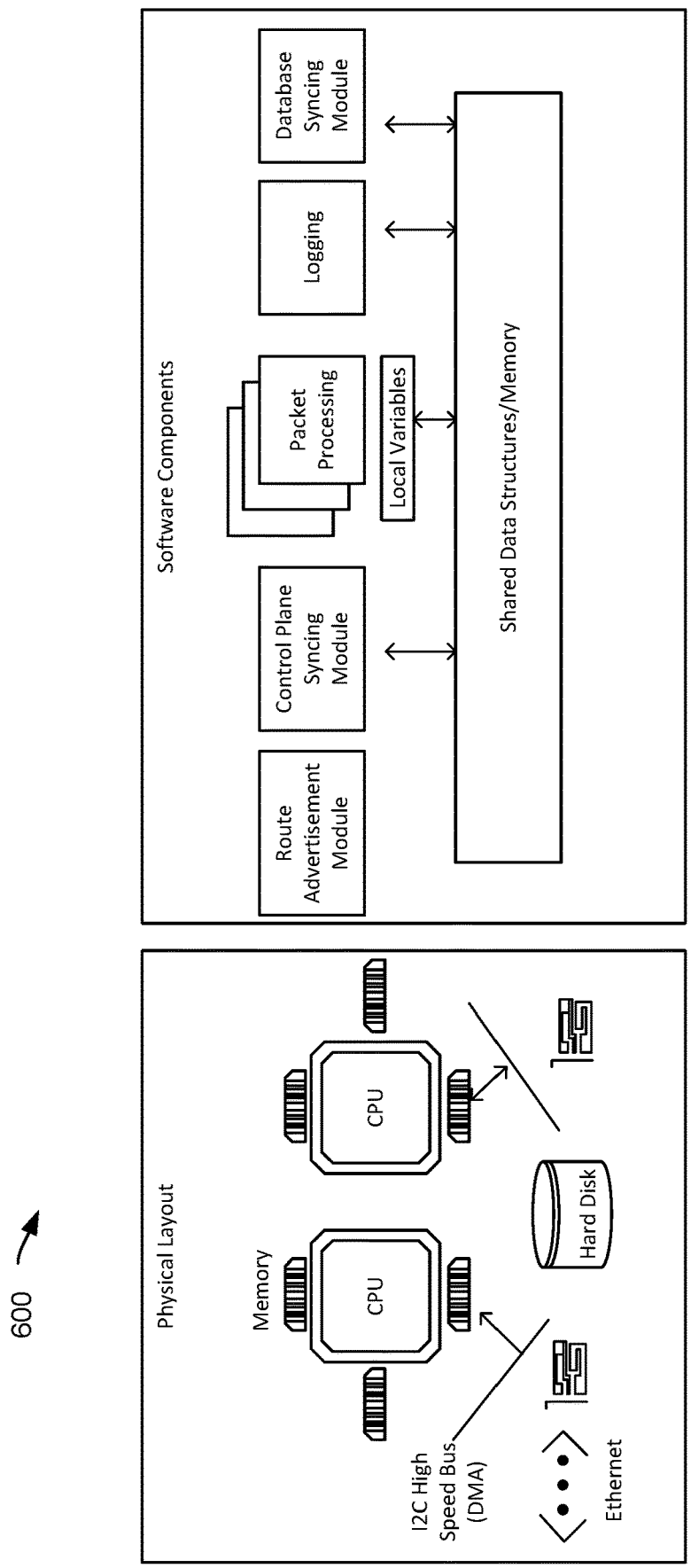
FIG. 6 illustrates an example of components of a host machine that provides routing functionalities according to certain embodiments.

FIG. 6 illustrates an example of components 600 of a host machine that provides routing functionalities, such as any of the routers R1, R2, R3, or R4 of FIGS. 4 and 5. As illustrated, the components 600 include physical components (shown on the left hand side) and software components (shown on the right hand side).

In an example, the physical components include one or more central processing units (CPUs) and one or more memories coupled with the CPUs. A memory can be a system memory, such as a random access memory (RAM), that includes a high speed cache. A memory can also be a hard disk. The physical components can further include one or more network interface cards (NICs), each of which is coupled with a memory (e.g., high speed cache) via an inter-integrated circuit (I2C) high speed bus. A NIC can also connect the host machine with a switch, such as TOR switch, via Ethernet.

The software components include one or more data structures stored in the memory(ies) (e.g., in a high speed cache) to support the allocation of NAT ports to packet flows and the use of the NAT ports in NAT operations. The software components also include a route advertisement module to, for instance, advertise an anycast IP address of the host machine; a control plane syncing module to, for instance, synchronize configuration information and updates with the control plane; packet processing threads, each of which can be usable to process a packet (e.g., allocate a NAT port, perform a NAT operation, and the like); a logging module to maintain event information; and a database syncing module to synchronize entries in the data structure with entries in the centralized database. The database syncing module can also include one or more database syncing threads.

Figure 7:
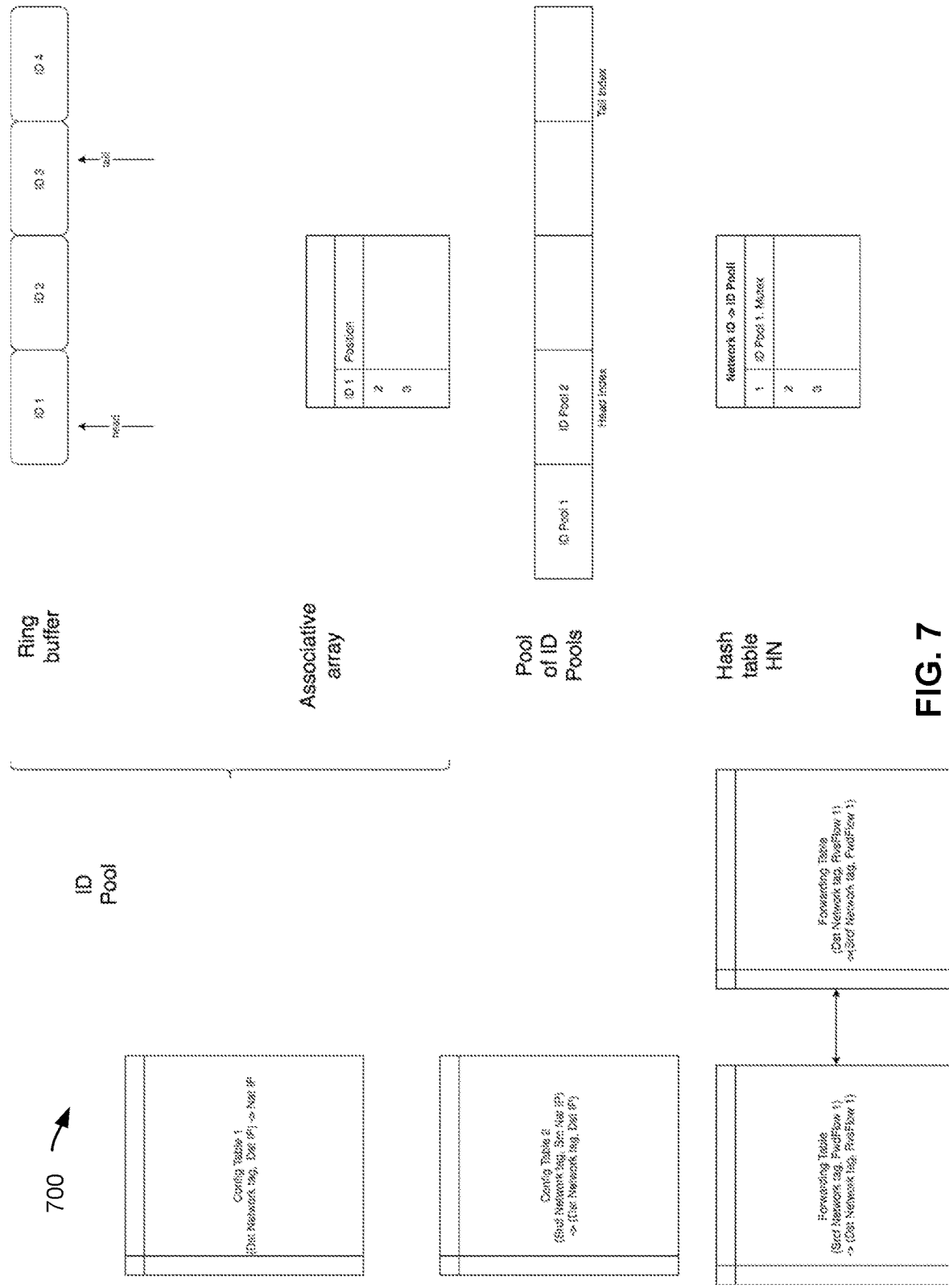
FIG. 7 illustrates an example of data structures usable by a host machine support of NAT operations according to certain embodiments.

FIG. 7 illustrates an example of data structures 700 usable by a host machine (e.g., any of the routers R1, R2, R3, or R4 of FIGS. 4-6) in support of NAT operations. The data structures can be stored in a high speed cache of the host machine, as illustrated in FIG. 6.

In an example, the data structures 700 include a forward configuration table (illustrated as "Config Table 1") and a reverse configuration table (illustrated as "Config Table 2"). These two tables store configuration information received from the control plane such as the NAT IP port(s) to use and the destination IP addresses of targets. For instance, the forward configuration table is usable for a forward flow and maps a destination network tag (e.g., "N2") and a destination IP address (e.g., the IP address of the target T1 as known to the client C1) with a NAT IP address. In comparison, the reverse configuration table is usable for a corresponding reverse flow and maps a source network tag (e.g., "N1") and a source NAT IP address with the destination network tag (e.g., "N2") and the destination IP address.

Further, the data structures 700 include forwarding tables. A first forwarding table (e.g., illustrated on the bottom left hand side of FIG. 7) is usable for the forward flow and maps the source network tag and an identifier of the forward flow (illustrated as "FwdFlow 1" and can be a hash of the 5-tuple included in the packet sent on the forward flow) with the destination network tag and an identifier of the reverse flow (illustrated as "RvsFlow 1" and can be a hash of the 5-tuple included in the packet sent on the reverse flow). A second forwarding table (e.g., illustrated to the right of the first table in FIG. 7) includes the opposite mapping for use in the reverse flow: the destination network tag and the identifier of the reverse flow are mapped to the source network tag and the identifier of the forward flow.

Additionally, the data structures 700 include a pool of identifier (ID) pools and a hash table HN. The pool of ID pools can be organized in a circular buffer, where each one of the ID pools is identified in an element of the circular buffer. An ID pool can include a set of NAT ports (e.g., 64,000 NAT ports) and can be allocated to a network (e.g., the first network N1) or to a pair of a network and a target (e.g., the first network N1 and the target T1). Upon allocation of this ID pool, NAT ports are allocated therefrom to packet flows from the network N1 and, as applicable, to the target T1. When a circular buffer is used, the allocation can follow a FIFO approach, where the ID pool at the header of the circular buffer is allocated and, thereafter, the header is moved to the next element of the circular buffer. Upon a release of the ID pool, the released ID pool can be indicated at the tail of the circular buffer. The hash table HN is used to track the allocation of the ID pools. In the case of the allocation to a network, a hash of the network tag and a lock (e.g., a mutex) are added to the hash table. In the case of the allocation to a pair of network-target, a hash of the network tag, the destination IP address of the target, and a lock (e.g., a mutex) is added to the hash table. In both cases, upon a release of the ID pool, the hash is removed from the hash table.

To allocate and maintain the allocation of NAT ports from an ID pool, the data structures 700 include a circular buffer and an associative array. The allocable NAT ports are indicated in the elements of the circular buffer. A next allocable NAT port is indicated by the header of the circular buffer. The latest (e.g., most delayed) allocable NAT port is indicated by the tail of the circular buffer. A NAT port that is already allocated and in current use is not indicated in the circular buffer. The associative array tracks the positions of the NAT ports in the circular buffer. This tracking allows shuffling (e.g., moving, swapping, and the like) of the NAT ports in the circular buffer such that a NAT port can be re-positioned from one element to another element of the circular buffer to accelerate or delay its allocation. For instance, in FIG. 7, ID1 is next in line to get allocated before ID2 (e.g., corresponding to a first NAT port and a second NAT port, correspondingly), according to the regular circular buffer logic, as it is at the "head" position. However, if ID2 needs to be allocated immediately for some reason (e.g., customer configuration associated with the use of NAT ports, or based on existing allocation of ID2 by another router to a flow that is now received on this router), ID2's position can be looked up using the associative array and ID1 and ID2 can swap positions in the circular buffer. This change in the positions is updated in the associative array. Various implementations of the associative array are possible. In one example, a key-value based hash table may be used, where the key is the NAT port and the value being the position in the ring. In another example, the associative array can be implemented as an indexed array, where the index represents the value of the NAT port and the stored entry, the position of the NAT port in the ring if present (otherwise −1) corresponds to an ID (e.g., NAT port). The value of an element indicates the position of the corresponding ID in the buffer. The sign of value indicates whether the ID has been allocated or not (e.g., a negative sign indicates that it has been allocated, a positive sign indicates otherwise).

Figure 8:
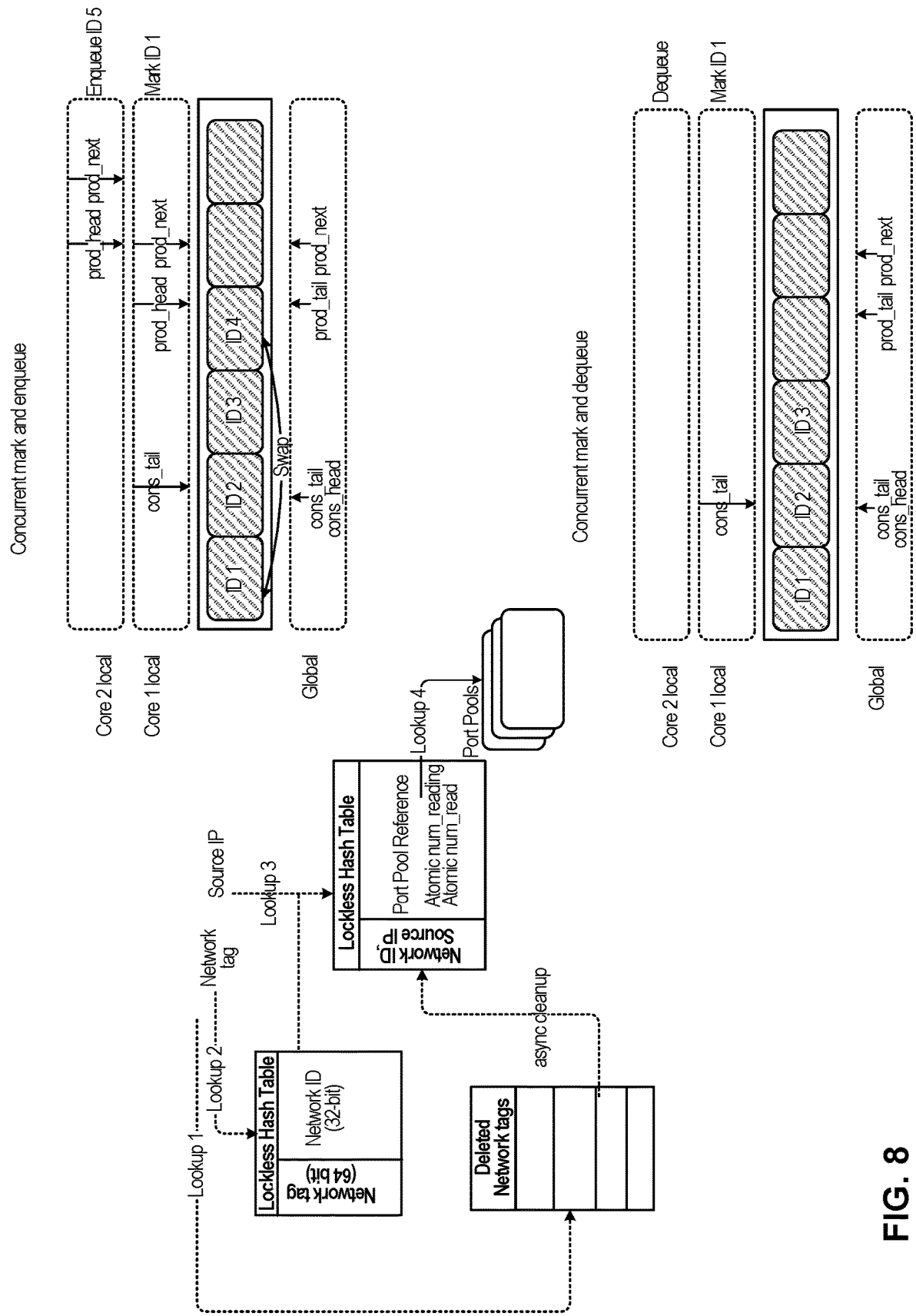
FIG. 8 illustrates an example of a fully lockless circular buffer adapted from a DPDK ring according to certain embodiments.
Figure 9:
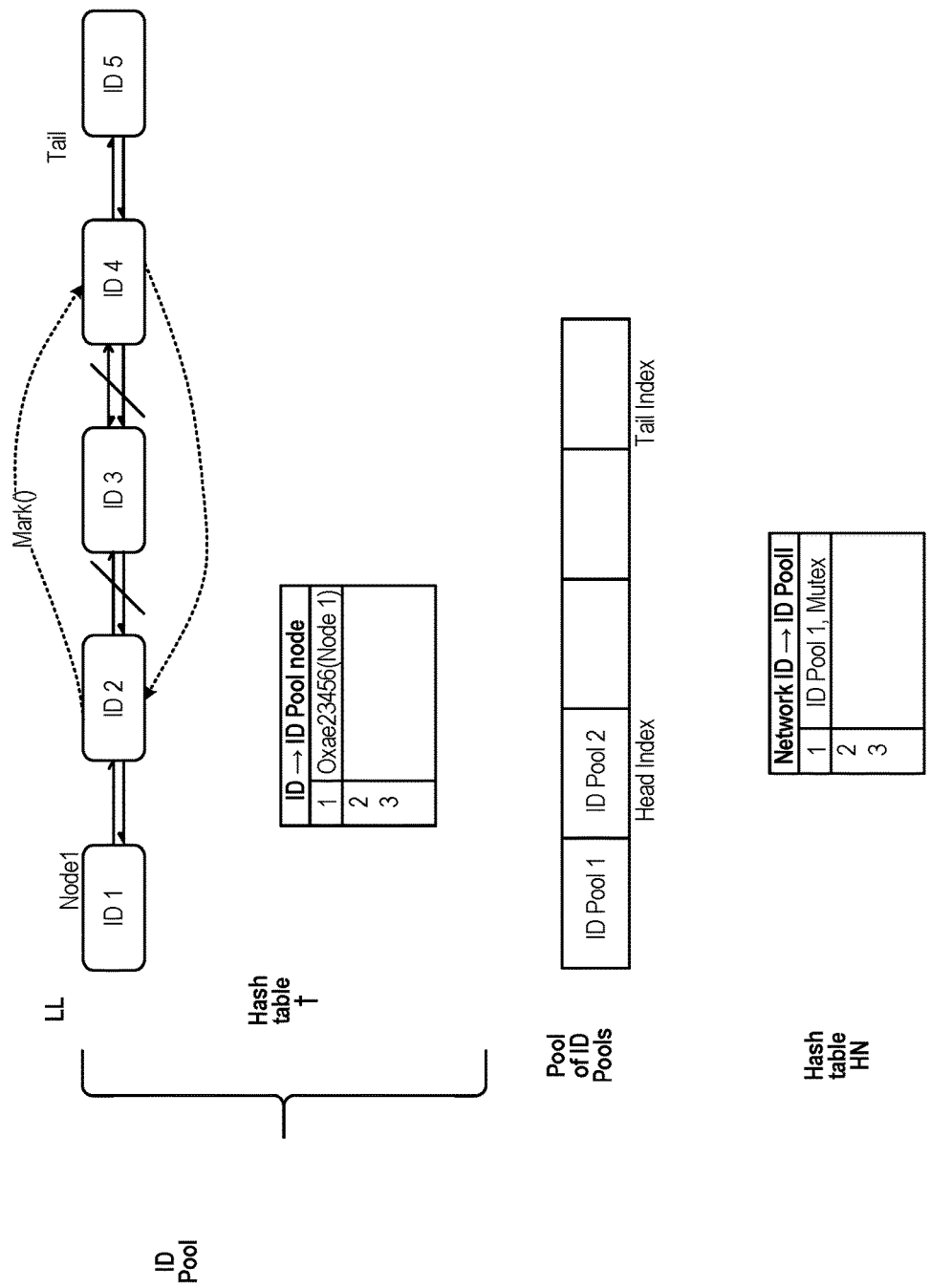
FIG. 9 illustrates an example of a doubly linked list with a hash table according to certain embodiments.
Figure 10:
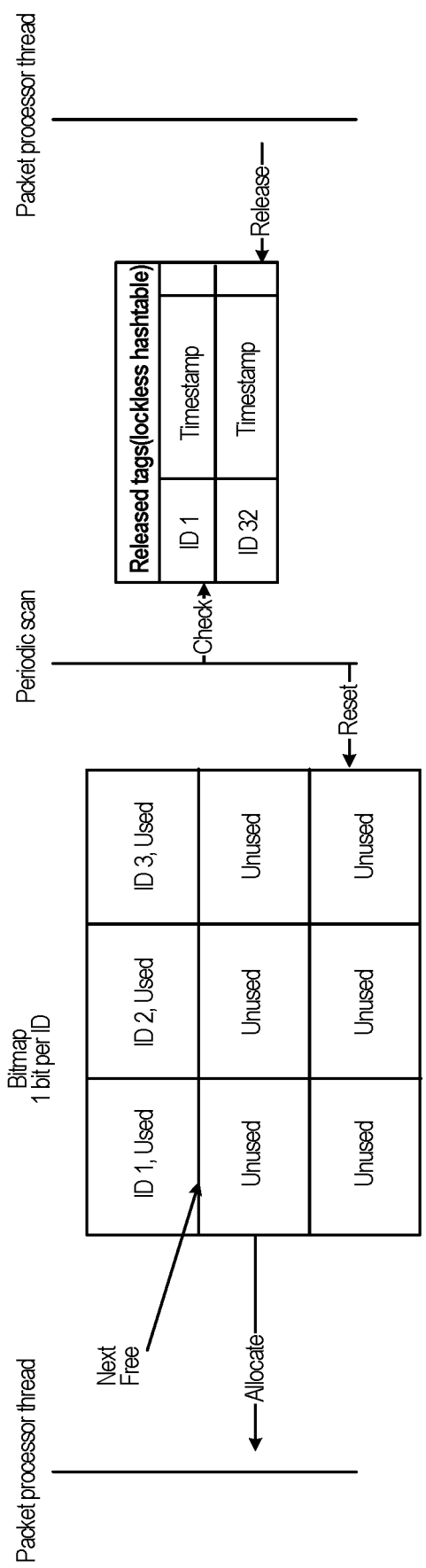
FIG. 10 illustrates an example of a bitmap with a timer according to certain embodiments.
Figure 11:
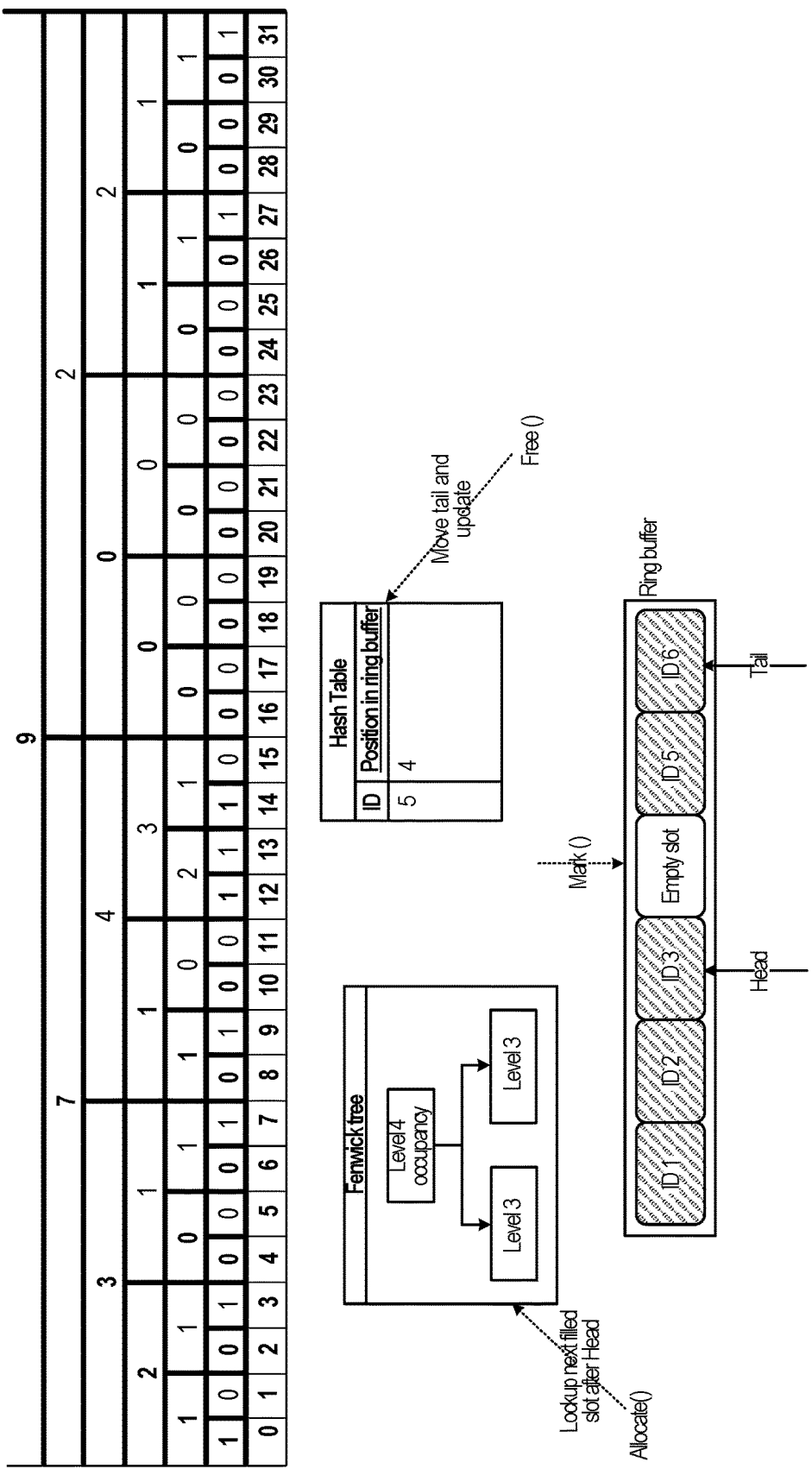
FIG. 11 illustrates an example of a circular buffer with empty slots, a Fenwick tree for tracking occupancy, and a hash table according to certain embodiments.
Figure 12:
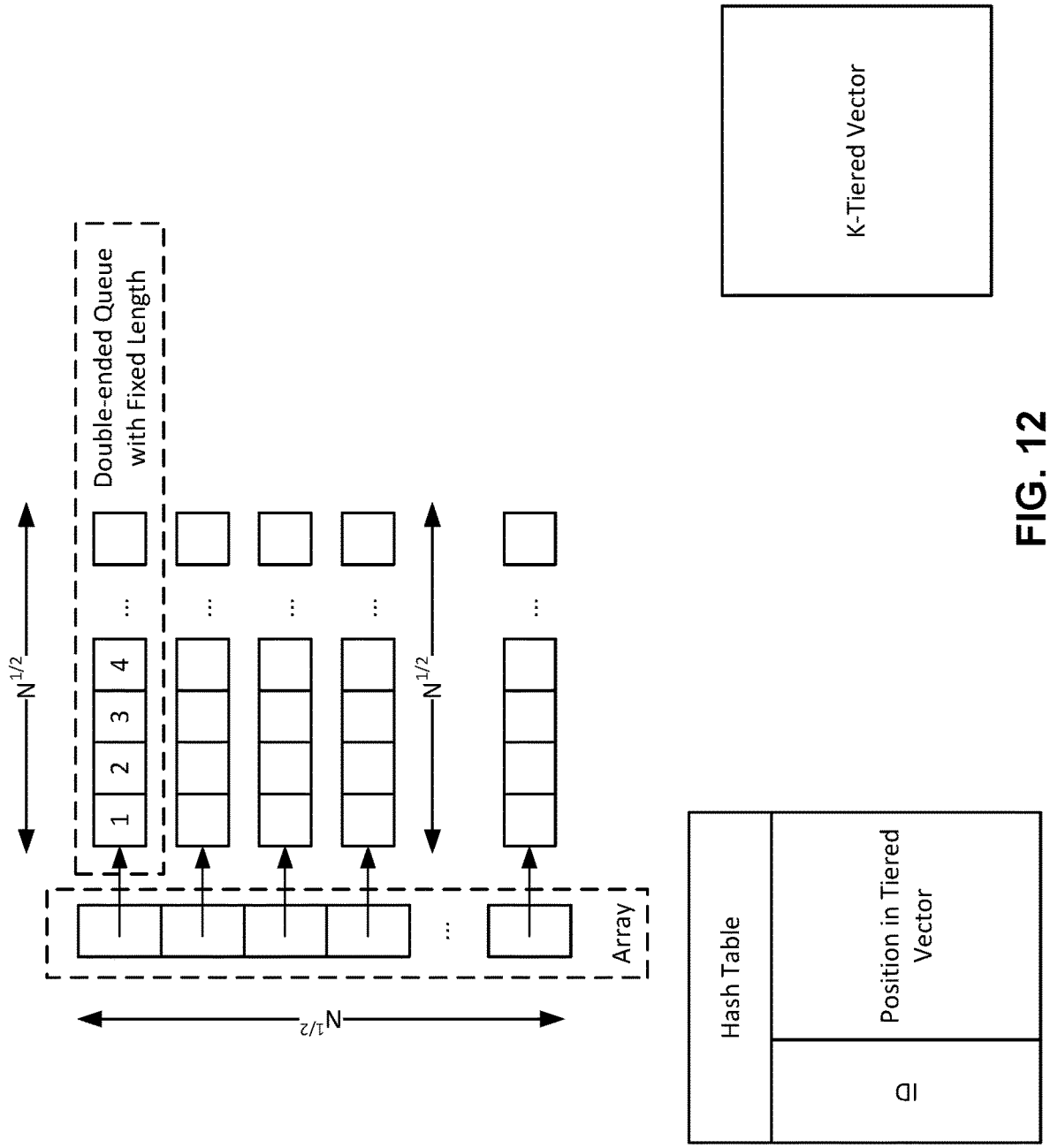
FIG. 12 illustrates an example of a tiered vector and a hash table according to certain embodiments.

The use of the above data structures is further described herein next. However, the examples of the present disclosure are not limited as such and similarly apply to other data structure types. Examples of additional or alternative data structures include a fully lockless circular buffer adapted from a DPDK ring, as illustrated in FIG. 8; a doubly linked list with a hash table as illustrated in FIG. 9; a bitmap with a timer as illustrated in FIG. 10; a circular buffer with empty slots, a Fenwick tree for tracking occupancy, and a hash table as illustrated in FIG. 11; and a tiered vector and a hash table, as illustrated in FIG. 12. Each of these data structures provides different sets of advantages, as summarized in Table 1 below.

TABLE 1

| Implementation | Time to Reuse | Full range utilized always | Cache-friendly | ASIC/FPGA friendly | Memory usage | Concurrency | Allocate complexity | Free complexity | Allocate Specific complexity |
|---|---|---|---|---|---|---|---|---|---|
| Circular buffer + Hash table with head swapping | High, if Allocate Specific infrequent Otherwise reasonably high | Yes | Yes | Yes | Low | High, can be lockless | O(1) | O(1) | O(1) |
| Fenwick tree + circular buffer + hash table | Maximum possible without compromising availability | Yes | Yes | Yes | Moderate | Needs locking | O(log n) | O(1) | O(1) |
| Tiered vector + hash table | Maximum possible without compromising availability | Yes | No | Yes | Moderate | High, can be lockless | $O(N^{1/k})$ | O(1) | O(1) |
| Bitmap with timer | Fixed interval | No | Yes | Yes | Low | High | O(1) | O(1) | O(1) |
| Doubly linked list + hash table | Maximum possible without compromising availability | Yes | No | No | Moderate | Low, needs per-node lock | O(1) | O(1) | O(1) |

In an illustrative example, a fixed number of circular buffers are used per network, designed to hold a list of available fixed-width identifiers $I_F$, referred to herein as ID Pools. In some examples, a doubly-linked list (e.g., as illustrated in FIG. 9 and listed in the last row of Table 1) may be used in place of a circular buffer (e.g., as illustrated in FIG. 7 and listed in the first row of Table 1) with a pair of references (or memory addresses or pointers) keeping track of head and tail values.

A circular buffer Γ is used to keep track of the pool of free ID Pools. An optional hash table Φ (or identifier indexed array, or other associative array, or TCAM) is used per ID pool in Γ, and permits fast lookup of the position in a circular buffer of a given identifier $I_F$. This is needed for applications in which it is desirable to quickly mark a given identifier as used, to avoid additional latency, at the cost of maintaining strict FIFO characteristics. In some examples, where the ID pool uses a doubly linked list (e.g., as in FIG. 9), the pointer to a node holding a value is instead stored.

An optional bitmap per ID Pool in Γ can be used, in case it is desirable to avoid the same identifier getting enqueued multiple times in the same ID Pool. A hash table HN keeping track of the allocation of ID Pool to network Ni is also used. Each network would be identified by a unique tag. In some embodiments, a lockless implementation is used to facilitate fast concurrent access to the ID Pools, in which case the network tag has to be mapped to a 32-bit or 64-bit integer depending on the machine word size. An optional mutex/binary semaphore/locking mechanism can be used per entry in HN, to synchronize access to each ID Pool in HN. In some examples, the circular buffer(s) can use a concurrency-safe implementation in which case the mutex is not needed to be locked for concurrent allocate/free operations.

Alternatively, a bitmap is used to track the free identifiers in the ID Pool (e.g., as illustrated in FIG. 10 and listed in the fourth row of Table 1), with the effect that IDs could potentially be reused soon after they are released back into the pool. Time of reuse of an ID can be tracked in a separate table with IDs being recycled back into the pool only after a fixed amount of time. Alternately, a separate queue data structure along with a periodic timer may be used to solve the problem of reuse.

In an alternate example, to minimize accesses to each ID pool and the locking entailed and to reduce the amount of logging, blocks of IDs may be stored in each entry of the circular buffer in the form of a range. The forwarding layer in R1 can obtain a block at a time and utilize the IDs therein until the entire block is exhausted.

The above illustrated data structures can support the following operations, or a subset of them as needed: (1) assign an ID pool for a network, initialized with a range of identifiers to be used, (2) remove a pool for a network, (3) allocate an ID from a given ID Pool for a new connection, (4) free ID back into an ID pool, and (5) mark a specific ID as allocated in an ID Pool so that it cannot be used for future allocations.

The following procedure can be used to support each operation. When a new pool is requested, a pool is dequeued from the circular buffer F and inserted into the hash table HN. When a pool is released, the entry is first marked as invalid to inform other threads to stop using it, and then the pool is re-initialized with the original ID range. When a packet processing thread requests an ID for a connection from network N, if an entry for N is not present in HN, an error code is returned. If one is present and the pool is not marked invalid, an ID is returned from the pool. When an ID is released after connection timeout or marking of a specific ID as allocated is desired, the same logic is used: the operation is performed on the pool entry if it is present and valid.

The entry in the hash table HN is locked before performing any mark/free/allocate/initialize operation. The first action of the allocator is to atomically mark the hash table entry as invalid in the remove API, to allow safe interleaving of pool removal or addition operations with the mark/free/allocate operations. Similarly, the pools are not marked as valid until initialization is finished in the assignment API.

FIG. 13 illustrates an example of a trace of execution of the Allocate/Free/Mark operations using an indexed array to implement the associative array Φ, where this array is referred to as "auxiliary array." As illustrated, three NAT ports are usable: NAT port 11, NAT port 12, NAT Port 13. An X symbol indicates a slot outside the range of allocable positions in the circular buffer. h and t indicate the circular buffer's head and tail, respectively. Upon initialization, NAT port 11, NAT port 12, and NAT Port 13 are positioned in this sequence in the circular buffer, with NAT port 11 being at the head and NAT port 13 at the tail. The auxiliary array indicates these positions as 1, 2, and 3 (corresponding to NAT port 11, NAT port 12, and NAT Port 13, respectively). Upon an allocate operation, NAT port 11 is returned to the API call, and the head of the circular buffer moves to the position of NAT port 12. For illustrative purposes, the original position is now marked with an X as the port is now outside the range of valid slots in the circular buffer. The auxiliary array is updated such that the position of the NAT port 11 uses a negative integer indicating the allocation. Upon a free operation (e.g., a release) of NAT port 11, NAT port 11 is added to the position earlier marked as X in the buffer, and the tail wraps to the original position of NAT port 11. The auxiliary array is also updated to indicate that NAT port 11 is at the fourth position in the circular buffer and is allocable. Upon an Allocate Specific operation (e.g., an operation to allocate a particular NAT port rather than the one at the header of the circular buffer) of NAT Port 13, the positions of NAT port 12 and NAT port 13 are swapped, thereby moving the NAT port 13 to the header of the circular buffer. NAT port 13 is allocated and the header moves to the current position of NAT port 12. The auxiliary array is updated to indicate that NAT port 13 has been allocated (e.g., by using the negative integer "−1" in the auxiliary array).

In addition to the above data structures and techniques, a technique is described whereby R1's packet processing threads can continue to run without significant delay, while a full configuration refresh is triggered, in the case when high throughput performance and low latency are desired. In one example of this technique, a single thread is responsible for handling the configuration updates. In another example of this technique, multiple threads can handle different partitions or shards of configuration using similar operations.

A lockless implementation of a hashtable is used for HN, and each network tag is mapped to a fixed-width integer. Two interchangeable copies of all the above data structures are maintained at all times in R1's memory, a shadow copy and a live copy. Two references can be maintained to keep track of the copy that is currently live and the one that is currently treated as a shadow copy.

For each network tag $N_i$, the configuration thread can generate a corresponding unique mapping to a fixed width integer $w_i$, by means of an incrementing counter. These mappings can be stored in another pair of hash tables HMshadow and HMlive, associated with the shadow and live copies respectively. Any operation which assigns or removes a pool would first involve lookup in HM to determine the corresponding $w_i$.

The packet processing threads can access the current live copy of the data structure at all times, via the reference. During a configuration refresh, the live copy would continue to be accessed by the packet processing threads for allocate and free operations, while the configuration thread would commence building the shadow copy by the process disclosed below. Once the shadow copy has been prepared based on the new list of networks, the configuration thread can then exchange the references to the shadow and live copies.

The following sequence of steps describes an example of a method of updating the shadow copy for a single entry $N_i$ of the list of network tags in the new configurations. (1) After generating a new integer mapping $w_i^{new}$ for $N_i$, the configuration thread searches for the old integer mapping for $N_i$ in the live table HMlive. This is a read operation and does not need locking. (2) If there is no corresponding entry, a conclusion is made that the network tag was not present in the original list and the configuration thread allocates a new ID pool for $w_i$ in the shadow copy of the pool data structure. (3) If an entry $w_i^{old}$ exists, the configuration thread proceeds to lock the ID pool for $w_i^{old}$ and copy the contents over to a new ID pool. Since this involves copying a small number of contiguous regions of memory such as a circular buffer and a bitmap, it can be achieved with reasonably small delay in packet processing. In case of a circular buffer, the lock might be held for the duration of a memory copy operation for which time complexity would be linear in the number of IDs in the pool. (4) Once the copying process is complete, the configuration thread adds a new entry to the HN hash table of the shadow data structure. (5) Once all ID pools have been copied over, the configuration thread swaps the references of the shadow and live data structures.

Referring back to FIGS. 4-6 and 13, examples for NAT operations are described herein next, where ID pools are used, each of which includes a set of NAT ports (e.g., the allocated identifiers are NAT ports).

An initial setup of R1 to Rn (e.g., n is four as shown in FIG. 4) is performed. During the initial setup, R1 to Rn are provisioned and any needed software is installed. Each one of R1 to Rn performs the following actions: (1) establishes a connection to the centralized database and synchronizes its data structures (e.g., the forwarding tables and the pool of ID Pools) based on the contents of the database, and (2) signals its availability to begin processing traffic, to its immediately connected neighboring switch (TOR switch). BGP route advertisement of a predetermined IP address (e.g., anycast IP address (AIP)) from the network shown connecting R1 . . . Rn (to S1, S2) is one such possible mechanism to signal availability.

Switches S1 . . . Sm are made aware of AIP and know to use it for flows that need NAT. In particular, a switch $S_i$ can send packets to the AIP, and the TOR switch determines what $R_i$ should receive the packet (e.g., based on a hash of some of the header information of the packet).

After the setup, a network administrator can perform a registration to allow a packet flow. For instance, N2's network administrator registers T1's IP address as a destination IP ready to receive traffic in network N2. T1 has services accepting flows on a plurality of ports.

The control plane assigns one or more NAT IPs (e.g., NATIP1, NATIP2) as allowed source IPs for R1, R2, . . . Rn to use while establishing flows with T1. It also assigns a unique destination IP (e.g., DstIP1) for network endpoints C1, C2 . . . to use as destination IP of T1.

The control plane sends the following mapping information to each device R1, . . . Rn: (N1, T1)→(NATIP1, NATIP2 . . . ) and (N2, DstIP1)→(N1, T1). This information is stored in configuration tables in each $R_i$. Destination IP addresses are separately configured on C1, C2 . . . Cn for T1 and for other services C1, C2, . . . Cn might attempt to contact.

A forward flow may occur between C1 and T1. In particular, a process running on C1 initiates a flow to DstIP1 and traffic is received by S1. This flow has a unique 5-tuple FwdFlow1 comprising of (Src IP1, SrcPort1, DstIP1, Dst Port 1, Protocol1). The flow consists of a sequence of multiple packets. S1 encapsulates each packet of the flow before forwarding to AIP. As part of the encapsulation header, it adds a tag identifying source network N1.

A TOR switch routes the packet to one of the devices, say R1, based on the packet headers (e.g., based on a hash of a portion thereof). R1 receives the packet via the Ethernet port and high speed bus of its hardware components. One of the packet processing threads (e.g., PP1) within R1 is selected for handling the packet, based on the 5-tuple values Fwd-Flow1.

The packet processing thread PP1 performs the following actions. (1) Looks up (N1, DstIP1) in its configuration table. (2) PP1 checks if the flow exists in its forwarding table that has the following structure: Key (N1, FwdFlow1) Value (N2, RvsFlow1). If the flow exists, PP1 determines the NAT port (e.g., NAT Port 11) that has been allocated to this flow and uses this NAT port in a NAT operation performed on the packet. (3) If the flow does not exist, PP1 attempts to allocate a NAT port using the ID Pool. If Source Port Preservation mode (e.g., a selectable option to use original NAT port whenever possible) is configured for the port range, it attempts to allocate the specific source port itself (e.g., NAT Port 11) from the ID Pool, if available in the ID Pool. Otherwise (if either Source Port Preservation Mode is not configured or the original port was not available), PP1 attempts to use the next port returned by the regular ID Pool allocate operation. In either case, to use the port for the flow, a set of sub-operations are performed. The sub-operations include PP1 constructing a new 5-tuple RvsFlow1 that includes (NATIP1, NATPort1, T1 (IP address), Dst Port 1, Protocol1) and passes this information to the database syncing thread via a shared queue. It keeps the packet in the NIC queue and continues processing other packets until further notice. The sub-operations also include the database syncing thread attempting to create two records in separate tables in the centralized database: Key (N1, FwdFlow1) →Value (N2, RvsFlow1) and Key (N2, RvsFlow1)→Value (N1, FwdFlow1). If either record exists (e.g., because R2 has already allocated NAT Port 11 to this flow when R2 was handling the flow, or if R1 previously allocated NAT Port 11 to this flow and R1 rebooted thereafter), multiple steps are performed. In a first step, the centralized database responds with an error to the database syncing thread and provides the actual stored values for the corresponding entries for (N1, FwdFlow1) and for (N2, RvsFlow1). This response allows R1 to update the error by updating its forward tables so that the keys are linked correctly. In a second step, the database syncing thread creates corresponding entries in Forwarding Table1 and Forwarding Table2. In a third step, the database syncing thread performs "allocate_specific" for the NAT port used in the actual RvsFlow2 record from the ID Pool (e.g., NAT Port 12), so that the ID Pool does not allocate it for future flows (NAT Port 11 is released). In a fourth step, the database syncing thread informs one of the packet processing threads (e.g., PP3) to continue processing the packet, providing the reference to the packet in the NIC queue. In a fifth step, PP3 forwards the packet to S2 using the information in the forwarding table. If no records exist, other steps are performed. In a first step, the database responds with a success code and the database sync thread creates the corresponding entries in the forwarding tables. In a second step, the database syncing thread informs PP1 to continue processing the packet. In a third step, PP1 forwards the packet using the information in the forwarding table.

R1 tracks whether flow is active, by timestamping the last processed packet and maintaining a timer. If the flow becomes inactive, the related information is removed from data structures to release the allocated NAT port.

The processing of a packet on the reverse flow follows a similar technique, except no NAT port is allocated (instead, the NAT port initially allocated on the forward flow is reused). Database syncing may be needed.

As explained herein above, a client (e.g., C1) in a private network (e.g., N1) can access a public network (e.g., a public server available on the internet). A method similar to the above can be used. In this case, however, there is no need for registration or DNAT, as the public IP address can be used.

Figure 14:
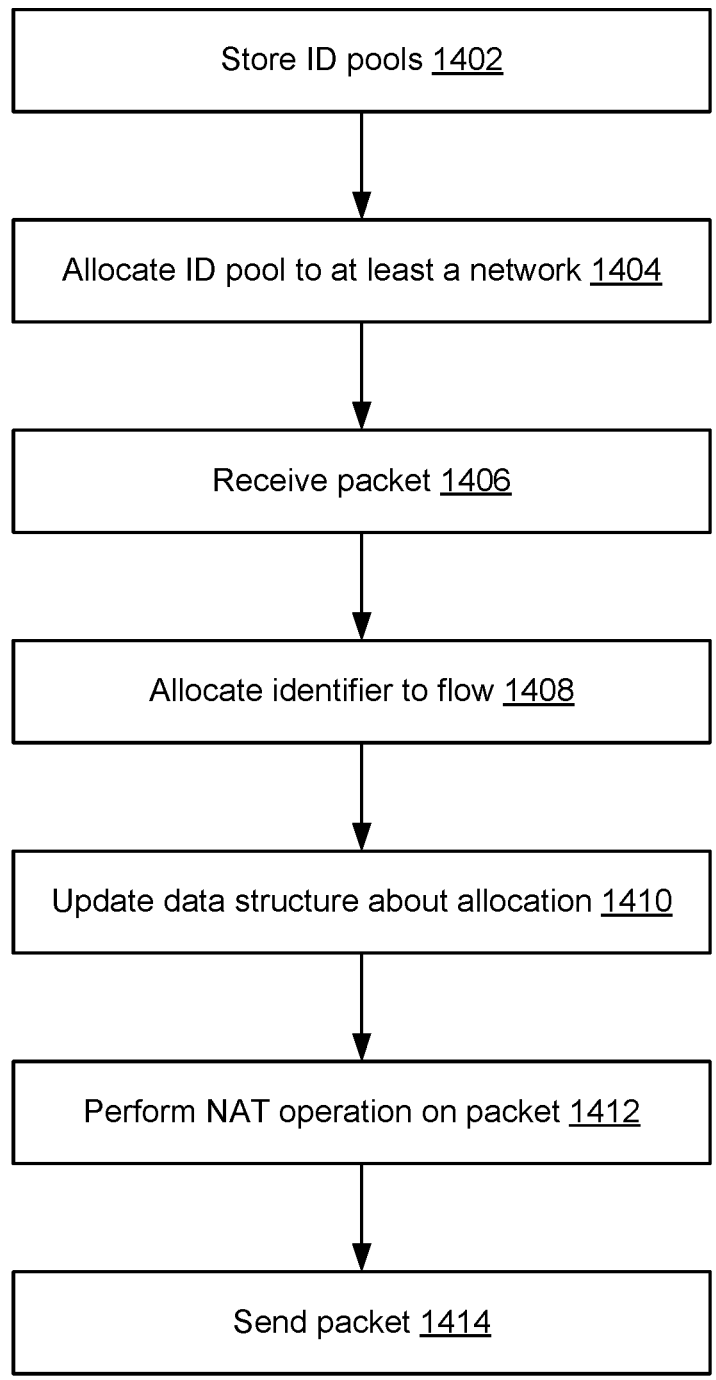
FIG. 14 illustrates an example of a method for maintaining and using a data structure to support NAT operations according to certain embodiments.

FIG. 14 illustrates an example of a method for maintaining and using a data structure to support NAT operations. The method may be performed by a NAT device, such as the NAT device 132 of FIG. 1. Some or all of the instructions for performing the operations can be implemented as hardware circuitry and/or stored as computer-readable instructions on a non-transitory computer-readable medium of the NAT device. As implemented, the instructions represent software or code executable by one or more processors of the NAT device. The execution of such instructions configures the NAT device to perform the specific operations described herein. Each circuitry or code, in combination with the relevant processor(s), represents a means for performing a respective operation(s). While the operations are illustrated in a particular order, it should be understood that no particular order is necessary and that one or more operations may be omitted, skipped, performed in parallel, and/or reordered.

The method may start at operation 1402, where the NAT device stores ID pools. For instance, an initial setup is performed, where the NAT device synchronizes its data structures with a centralized database, including its forwarding tables and ID pools that have been allocated. Each ID pool can be stored in a first circular buffer at a high-speed cache of the NAT device. IDs from an ID pool that have been allocated can be indicated as so in an associative array. The NAT device can also store, in its high-speed cache, a second circular buffer that indicates an order of allocable ID pools and a hash table that indicates the ID pools that have been allocated.

At operation 1404, the NAT device allocates an ID pool to at least a network. As explained herein above, the ID pool can be allocated to a network only (e.g., N1) or to a pair of a network and a target (e.g., (N1, T1)). Upon a configuration event from a control plan indicating the allocation, the NAT device selects the next available ID pool from the second circular buffer and allocates it to the network and, as applicable, the target. This allocation is indicated in the hash table. In an example, the ID pool includes a set of NAT ports (e.g., 64,000 NAT ports). The entire set can be allocated for the packet flows processed by the NAT device. Alternatively, a subset of the NAT ports is allocated, whereas the remaining subset(s) can be allocated to the packet flows that are processed by one or more other NAT devices and that are from the network and, as applicable, to the target. In other words, the set of NAT ports is organized in NAT port ranges, and specific NAT port ranges are used by each of the NAT devices in its allocation of NAT ports to packets flows from the network and, as applicable, to the target.

At operation 1406, the NAT device receives a packet. For instance, the packet is sent from a client C1 of the network to the target T1. At operation 1408, the NAT device allocates an identifier to the packet flow from the client C1 to the target T1. For instance, the identifier includes a NAT port from the ID pool. Different types of allocation are possible. In an example, the NAT device determines the next available ID from the first circular buffer and checks that this ID can be allocated by sending a request to the centralized database. If it can be allocated, the centralized database returns a confirmation message and updates its entries to indicate this allocation. In turn, the NAT device removes the ID from the first circular buffer and updates the associative array at operation 1410. If not allocable, the database returns an error message indicating that the ID is not allocable and another ID that can be allocated. Here, the NAT device removes both IDs from the first circular buffer and updates the associative array at operation 1410. In another example, the selection is targeted, where the NAT device selects a particular ID from the circular buffer even if this ID is not at the header of the circular buffer. A swap operation can be performed to move the ID to the header. A similar confirmation is performed by sending a request to the database, resulting in the removal of the applicable ID from the first circular buffer and an update to the associative array at operation 1410.

At operation 1412, the NAT device performs a NAT operation on the packet based on the identifier. For instance, to send the packet to the target, the NAT device replaces the source IP address and source port with the NAT IP address and NAT port, respectively. At operation 1414, the NAT device sends the packet. For instance, upon performing the NAT operation(s), the processed packet is sent to the next network hop for routing to the target (on the forward flow) or the client (on the reverse flow).

The methods, devices, systems, networks, and data structures described herein above can be implemented in cloud computing. Infrastructure as a service (IaaS) is one particular type of cloud computing. IaaS can be configured to provide virtualized computing resources over a public network (e.g., the internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering). Thus, as these services may be policy-driven, IaaS users may be able to implement policies to drive load balancing to maintain application availability and performance.

In some instances, IaaS customers may access resources and services through a wide area network (WAN), such as the interne, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not, be a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 15:
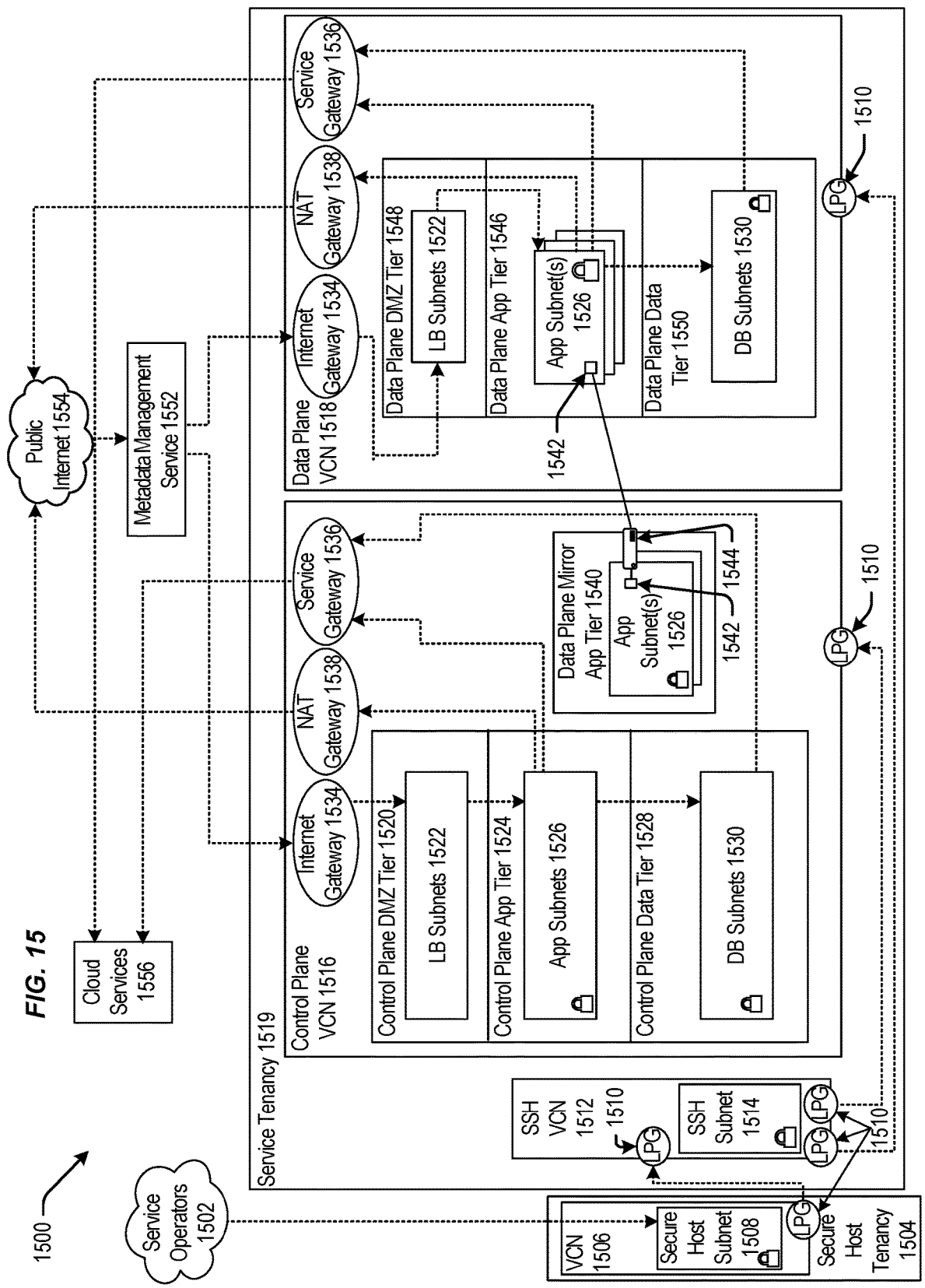
FIG. 15 is a block diagram illustrating an example of a pattern of an IaaS architecture according to certain embodiments.

FIG. 15 is a block diagram 1500 illustrating an example pattern of an IaaS architecture, according to at least one embodiment. Service operators 1502 can be communicatively coupled to a secure host tenancy 1504 that can include a virtual cloud network (VCN) 1506 and a secure host subnet 1508. In some examples, the service operators 1502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being internet, email, short message service (SMS), Blackberry®, or other enabled communication protocols. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an internet-enabled gaming system (e.g., a Microsoft Xbox gaming console with or without a Kinect®-gesture input device), and/or a personal messaging device, capable of communicating over a network that can access the VCN 1506 and/or the internet.

The VCN 1506 can include a local peering gateway (LPG) 1510 that can be communicatively coupled to a secure shell (SSH) VCN 1512 via an LPG 1510 contained in the SSH VCN 1512. The SSH VCN 1512 can include an SSH subnet 1514, and the SSH VCN 1512 can be communicatively coupled to a control plane VCN 1516 via the LPG 1510 contained in the control plane VCN 1516. Also, the SSH VCN 1512 can be communicatively coupled to a data plane VCN 1518 via an LPG 1510. The control plane VCN 1516 and the data plane VCN 1518 can be contained in a service tenancy 1519 that can be owned and/or operated by the IaaS provider.

The control plane VCN 1516 can include a control plane demilitarized zone (DMZ) tier 1520 that acts as a perimeter network (e.g., portions of a corporate network between the corporate intranet and external networks). The DMZ-based servers may have restricted responsibilities and help keep security breaches contained. Additionally, the DMZ tier 1520 can include one or more load balancer (LB) subnet(s) 1522, a control plane app tier 1524 that can include app subnet(s) 1526, a control plane data tier 1528 that can include database (DB) subnet(s) 1530 (e.g., frontend DB subnet(s) and/or backend DB subnet(s)). The LB subnet(s) 1522 contained in the control plane DMZ tier 1520 can be communicatively coupled to the app subnet(s) 1526 contained in the control plane app tier 1524 and an internet gateway 1534 that can be contained in the control plane VCN 1516, and the app subnet(s) 1526 can be communicatively coupled to the DB subnet(s) 1530 contained in the control plane data tier 1528 and a service gateway 1536 and a network address translation (NAT) gateway 1538. The control plane VCN 1516 can include the service gateway 1536 and the NAT gateway 1538.

The control plane VCN 1516 can include a data plane mirror app tier 1540 that can include app subnet(s) 1526. The app subnet(s) 1526 contained in the data plane mirror app tier 1540 can include a virtual network interface controller (VNIC) 1542 that can execute a compute instance 1544. The compute instance 1544 can communicatively couple the app subnet(s) 1526 of the data plane mirror app tier 1540 to app subnet(s) 1526 that can be contained in a data plane app tier 1546.

The data plane VCN 1518 can include the data plane app tier 1546, a data plane DMZ tier 1548, and a data plane data tier 1550. The data plane DMZ tier 1548 can include LB subnet(s) 1522 that can be communicatively coupled to the app subnet(s) 1526 of the data plane app tier 1546 and the internet gateway 1534 of the data plane VCN 1518. The app subnet(s) 1526 can be communicatively coupled to the service gateway 1536 of the data plane VCN 1518 and the NAT gateway 1538 of the data plane VCN 1518. The data plane data tier 1550 can also include the DB subnet(s) 1530 that can be communicatively coupled to the app subnet(s) 1526 of the data plane app tier 1546.

The internet gateway 1534 of the control plane VCN 1516 and of the data plane VCN 1518 can be communicatively coupled to a metadata management service 1552 that can be communicatively coupled to public internet 1554. Public internet 1554 can be communicatively coupled to the NAT gateway 1538 of the control plane VCN 1516 and of the data plane VCN 1518. The service gateway 1536 of the control plane VCN 1516 and of the data plane VCN 1518 can be communicatively couple to cloud services 1556.

In some examples, the service gateway 1536 of the control plane VCN 1516 or of the data plane VCN 1518 can make application programming interface (API) calls to cloud services 1556 without going through public internet 1554. The API calls to cloud services 1556 from the service gateway 1536 can be one-way: the service gateway 1536 can make API calls to cloud services 1556, and cloud services 1556 can send requested data to the service gateway 1536. But, cloud services 1556 may not initiate API calls to the service gateway 1536.

In some examples, the secure host tenancy 1504 can be directly connected to the service tenancy 1519, which may be otherwise isolated. The secure host subnet 1508 can communicate with the SSH subnet 1514 through an LPG 1510 that may enable two-way communication over an otherwise isolated system. Connecting the secure host subnet 1508 to the SSH subnet 1514 may give the secure host subnet 1508 access to other entities within the service tenancy 1519.

The control plane VCN 1516 may allow users of the service tenancy 1519 to set up or otherwise provision desired resources. Desired resources provisioned in the control plane VCN 1516 may be deployed or otherwise used in the data plane VCN 1518. In some examples, the control plane VCN 1516 can be isolated from the data plane VCN 1518, and the data plane mirror app tier 1540 of the control plane VCN 1516 can communicate with the data plane app tier 1546 of the data plane VCN 1518 via VNICs 1542 that can be contained in the data plane mirror app tier 1540 and the data plane app tier 1546.

In some examples, users of the system, or customers, can make requests, for example create, read, update, or delete (CRUD) operations, through public internet 1554 that can communicate the requests to the metadata management service 1552. The metadata management service 1552 can communicate the request to the control plane VCN 1516 through the internet gateway 1534. The request can be received by the LB subnet(s) 1522 contained in the control plane DMZ tier 1520. The LB subnet(s) 1522 may determine that the request is valid, and in response to this determination, the LB subnet(s) 1522 can transmit the request to app subnet(s) 1526 contained in the control plane app tier 1524. If the request is validated and requires a call to public internet 1554, the call to public internet 1554 may be transmitted to the NAT gateway 1538 that can make the call to public internet 1554. Memory that may be desired to be stored by the request can be stored in the DB subnet(s) 1530.

In some examples, the data plane mirror app tier 1540 can facilitate direct communication between the control plane VCN 1516 and the data plane VCN 1518. For example, changes, updates, or other suitable modifications to configuration may be desired to be applied to the resources contained in the data plane VCN 1518. Via a VNIC 1542, the control plane VCN 1516 can directly communicate with, and can thereby execute the changes, updates, or other suitable modifications to configuration to, resources contained in the data plane VCN 1518.

In some embodiments, the control plane VCN 1516 and the data plane VCN 1518 can be contained in the service tenancy 1519. In this case, the user, or the customer, of the system may not own or operate either the control plane VCN 1516 or the data plane VCN 1518. Instead, the IaaS provider may own or operate the control plane VCN 1516 and the data plane VCN 1518, both of which may be contained in the service tenancy 1519. This embodiment can enable isolation of networks that may prevent users or customers from interacting with other users', or other customers', resources. Also, this embodiment may allow users or customers of the system to store databases privately without needing to rely on public internet 1554, which may not have a desired level of security, for storage.

In other embodiments, the LB subnet(s) 1522 contained in the control plane VCN 1516 can be configured to receive a signal from the service gateway 1536. In this embodiment, the control plane VCN 1516 and the data plane VCN 1518 may be configured to be called by a customer of the IaaS provider without calling public internet 1554. Customers of the IaaS provider may desire this embodiment since database(s) that the customers use may be controlled by the IaaS provider and may be stored on the service tenancy 1519, which may be isolated from public internet 1554.

Figure 16:
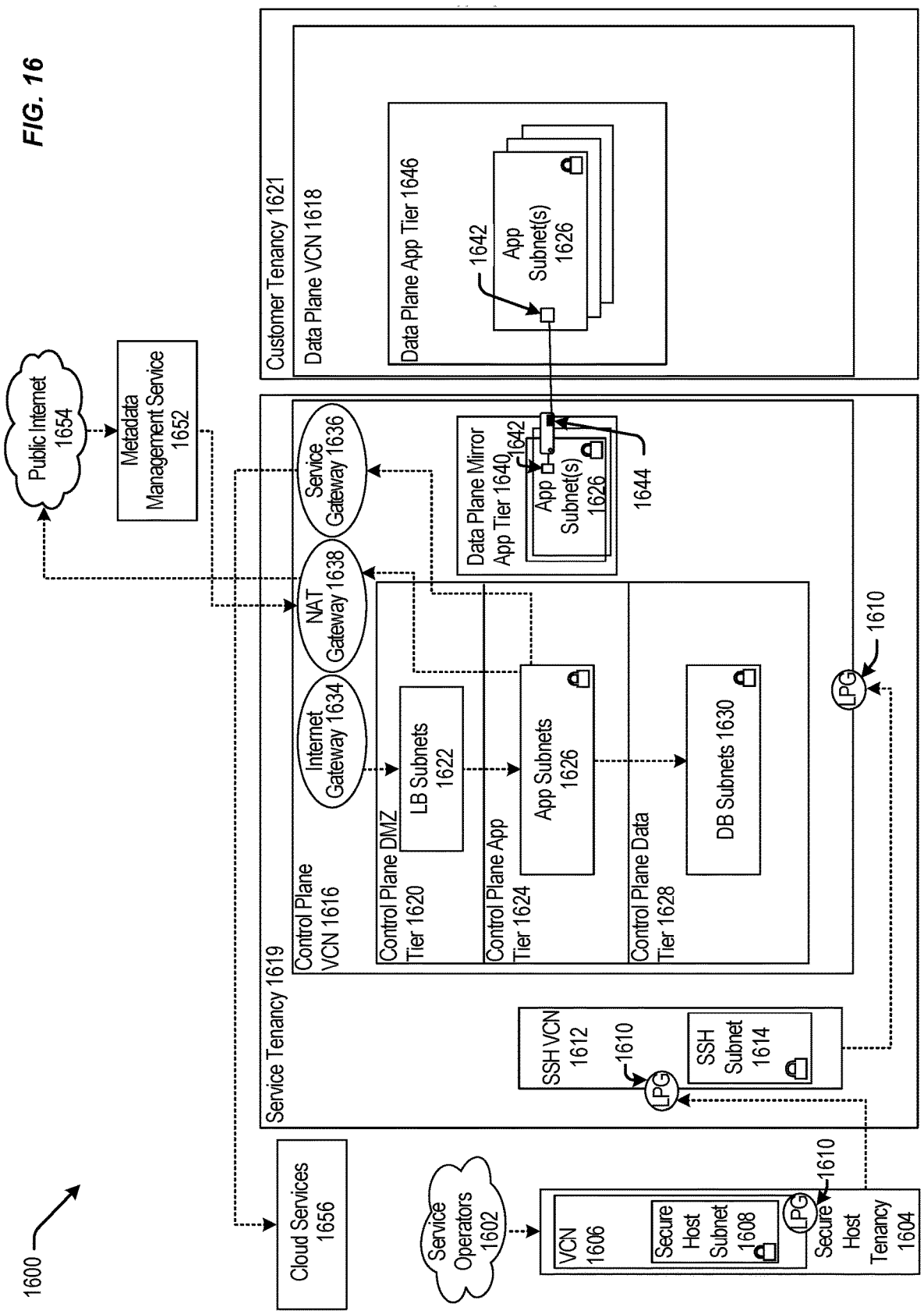
FIG. 16 is a block diagram illustrating another example of a pattern of an IaaS architecture according to certain embodiments.

FIG. 16 is a block diagram 1600 illustrating another example pattern of an IaaS architecture, according to at least one embodiment. Service operators 1602 (e.g. service operators 1502 of FIG. 15) can be communicatively coupled to a secure host tenancy 1604 (e.g. the secure host tenancy 1504 of FIG. 15) that can include a virtual cloud network (VCN) 1606 (e.g. the VCN 1506 of FIG. 15) and a secure host subnet 1608 (e.g. the secure host subnet 1508 of FIG. 15). The VCN 1606 can include a local peering gateway (LPG) 1610 (e.g. the LPG 1510 of FIG. 15) that can be communicatively coupled to a secure shell (SSH) VCN 1612 (e.g. the SSH VCN 1512 of FIG. 15) via an LPG 1510 contained in the SSH VCN 1612. The SSH VCN 1612 can include an SSH subnet 1614 (e.g. the SSH subnet 1514 of FIG. 15), and the SSH VCN 1612 can be communicatively coupled to a control plane VCN 1616 (e.g. the control plane VCN 1516 of FIG. 15) via an LPG 1610 contained in the control plane VCN 1616. The control plane VCN 1616 can be contained in a service tenancy 1619 (e.g. the service tenancy 1519 of FIG. 15), and the data plane VCN 1618 (e.g. the data plane VCN 1518 of FIG. 15) can be contained in a customer tenancy 1621 that may be owned or operated by users, or customers, of the system.

The control plane VCN 1616 can include a control plane DMZ tier 1620 (e.g. the control plane DMZ tier 1520 of FIG. 15) that can include LB subnet(s) 1622 (e.g. LB subnet(s) 1522 of FIG. 15), a control plane app tier 1624 (e.g. the control plane app tier 1524 of FIG. 15) that can include app subnet(s) 1626 (e.g. app subnet(s) 1526 of FIG. 15), a control plane data tier 1628 (e.g. the control plane data tier 1528 of FIG. 15) that can include database (DB) subnet(s)

1630 (e.g. similar to DB subnet(s) 1530 of FIG. 15). The LB subnet(s) 1622 contained in the control plane DMZ tier 1620 can be communicatively coupled to the app subnet(s) 1626 contained in the control plane app tier 1624 and an internet gateway 1634 (e.g. the internet gateway 1534 of FIG. 15) that can be contained in the control plane VCN 1616, and the app subnet(s) 1626 can be communicatively coupled to the DB subnet(s) 1630 contained in the control plane data tier 1628 and a service gateway 1636 (e.g. the service gateway of FIG. 15) and a network address translation (NAT) gateway 1638 (e.g. the NAT gateway 1538 of FIG. 15). The control plane VCN 1616 can include the service gateway 1636 and the NAT gateway 1638.

The control plane VCN 1616 can include a data plane mirror app tier 1640 (e.g. the data plane mirror app tier 1540 of FIG. 15) that can include app subnet(s) 1626. The app subnet(s) 1626 contained in the data plane mirror app tier 1640 can include a virtual network interface controller (VNIC) 1642 (e.g. the VNIC of 1542) that can execute a compute instance 1644 (e.g. similar to the compute instance 1544 of FIG. 15). The compute instance 1644 can facilitate communication between the app subnet(s) 1626 of the data plane mirror app tier 1640 and the app subnet(s) 1626 that can be contained in a data plane app tier 1646 (e.g. the data plane app tier 1546 of FIG. 15) via the VNIC 1642 contained in the data plane mirror app tier 1640 and the VNIC 1642 contained in the data plane app tier 1646.

The internet gateway 1634 contained in the control plane VCN 1616 can be communicatively coupled to a metadata management service 1652 (e.g. the metadata management service 1552 of FIG. 15) that can be communicatively coupled to public internet 1654 (e.g. public internet 1554 of FIG. 15). Public internet 1654 can be communicatively coupled to the NAT gateway 1638 contained in the control plane VCN 1616. The service gateway 1636 contained in the control plane VCN 1616 can be communicatively couple to cloud services 1656 (e.g. cloud services 1556 of FIG. 15).

In some examples, the data plane VCN 1618 can be contained in the customer tenancy 1621. In this case, the IaaS provider may provide the control plane VCN 1616 for each customer, and the IaaS provider may, for each customer, set up a unique compute instance 1644 that is contained in the service tenancy 1619. Each compute instance 1644 may allow communication between the control plane VCN 1616, contained in the service tenancy 1619, and the data plane VCN 1618 that is contained in the customer tenancy 1621. The compute instance 1644 may allow resources that are provisioned in the control plane VCN 1616 and is contained in the service tenancy 1619, to be deployed or otherwise used in the data plane VCN 1618 contained in the customer tenancy 1621.

In other examples, the customer of the IaaS provider may have databases that live in the customer tenancy 1621. In this example, the control plane VCN 1616 can include the data plane mirror app tier 1640 that can include app subnet(s) 1626. The data plane mirror app tier 1640 can reside in the data plane VCN 1618, but the data plane mirror app tier 1640 may not live in the data plane VCN 1618. That is, the data plane mirror app tier 1640 may have access to the customer tenancy 1621, but the data plane mirror app tier 1640 may not exist in the data plane VCN 1618 or be owned or operated by the customer of the IaaS provider. The data plane mirror app tier 1640 may be configured to make calls to the data plane VCN 1618 but may not be configured to make calls to any entity contained in the control plane VCN 1616. The customer may desire to deploy or otherwise use resources in the data plane VCN 1618 that are provisioned in the control plane VCN 1616, and the data plane mirror app tier 1640 can facilitate the desired deployment or other usage of resources of the customer.

In some embodiments, the customer of the IaaS provider can apply filters to the data plane VCN 1618. In this embodiment, the customer can determine what the data plane VCN 1618 can access, and the customer may restrict access to public internet 1654 from the data plane VCN 1618. The IaaS provider may not be able to apply filters or otherwise control access of the data plane VCN 1618 to any outside networks or databases. Applying filters and controls by the customer onto the data plane VCN 1618, contained in the customer tenancy 1621, can help isolate the data plane VCN 1618 from other customers and from public internet 1654.

In some embodiments, cloud services 1656 can be called by the service gateway 1636 to access services that may not exist on public internet 1654, on the control plane VCN 1616, or on the data plane VCN 1618. The connection between cloud services 1656 and the control plane VCN 1616 or the data plane VCN 1618 may not be live or continuous. Cloud services 1656 may exist on a different network owned or operated by the IaaS provider. Cloud services 1656 may be configured to receive calls from the service gateway 1636 and may be configured to not receive calls from public internet 1654. Some cloud services 1656 may be isolated from other cloud services 1656, and the control plane VCN 1616 may be isolated from cloud services 1656 that may not be in the same region as the control plane VCN 1616. For example, the control plane VCN 1616 may be located in "Region 1," and cloud service "Deployment 15," may be located in Region 1 and in "Region 2." If a call to Deployment 15 is made by the service gateway 1636 contained in the control plane VCN 1616 located in Region 1, the call may be transmitted to Deployment 15 in Region 1. In this example, the control plane VCN 1616, or Deployment 15 in Region 1, may not be communicatively coupled to, or otherwise in communication with, Deployment 15 in Region 2.

Figure 17:
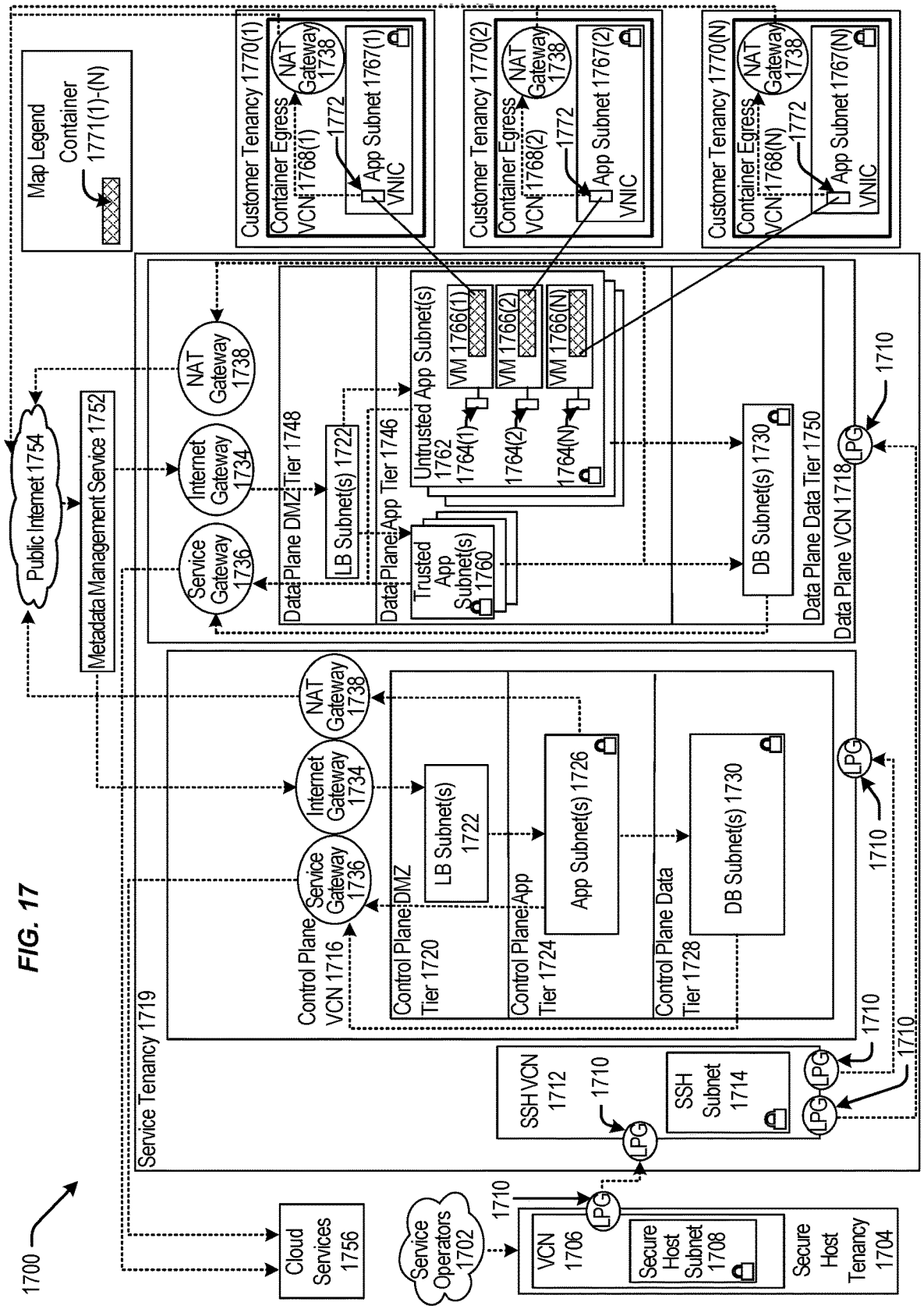
FIG. 17 is a block diagram illustrating another example of a pattern of an IaaS architecture, according to at least one embodiment according to certain embodiments.

FIG. 17 is a block diagram 1700 illustrating another example pattern of an IaaS architecture, according to at least one embodiment. Service operators 1702 (e.g. service operators 1502 of FIG. 15) can be communicatively coupled to a secure host tenancy 1704 (e.g. the secure host tenancy 1504 of FIG. 15) that can include a virtual cloud network (VCN) 1706 (e.g. the VCN 1506 of FIG. 15) and a secure host subnet 1708 (e.g. the secure host subnet 1508 of FIG. 15). The VCN 1706 can include an LPG 1710 (e.g. the LPG 1510 of FIG. 15) that can be communicatively coupled to an SSH VCN 1712 (e.g. the SSH VCN 1512 of FIG. 15) via an LPG 1710 contained in the SSH VCN 1712. The SSH VCN 1712 can include an SSH subnet 1714 (e.g. the SSH subnet 1514 of FIG. 15), and the SSH VCN 1712 can be communicatively coupled to a control plane VCN 1716 (e.g. the control plane VCN 1516 of FIG. 15) via an LPG 1710 contained in the control plane VCN 1716 and to a data plane VCN 1718 (e.g. the data plane 1518 of FIG. 15) via an LPG 1710 contained in the data plane VCN 1718. The control plane VCN 1716 and the data plane VCN 1718 can be contained in a service tenancy 1719 (e.g. the service tenancy 1519 of FIG. 15).

The control plane VCN 1716 can include a control plane DMZ tier 1720 (e.g. the control plane DMZ tier 1520 of FIG. 15) that can include load balancer (LB) subnet(s) 1722 (e.g. LB subnet(s) 1522 of FIG. 15), a control plane app tier 1724 (e.g. the control plane app tier 1524 of FIG. 15) that can include app subnet(s) 1726 (e.g. similar to app subnet(s)

1526 of FIG. 15), a control plane data tier 1728 (e.g. the control plane data tier 1528 of FIG. 15) that can include DB subnet(s) 1730. The LB subnet(s) 1722 contained in the control plane DMZ tier 1720 can be communicatively coupled to the app subnet(s) 1726 contained in the control plane app tier 1724 and to an internet gateway 1734 (e.g. the internet gateway 1534 of FIG. 15) that can be contained in the control plane VCN 1716, and the app subnet(s) 1726 can be communicatively coupled to the DB subnet(s) 1730 contained in the control plane data tier 1728 and to a service gateway 1736 (e.g. the service gateway of FIG. 15) and a network address translation (NAT) gateway 1738 (e.g. the NAT gateway 1538 of FIG. 15). The control plane VCN 1716 can include the service gateway 1736 and the NAT gateway 1738.

The data plane VCN 1718 can include a data plane app tier 1746 (e.g. the data plane app tier 1546 of FIG. 15), a data plane DMZ tier 1748 (e.g. the data plane DMZ tier 1548 of FIG. 15), and a data plane data tier 1750 (e.g. the data plane data tier 1550 of FIG. 15). The data plane DMZ tier 1748 can include LB subnet(s) 1722 that can be communicatively coupled to trusted app subnet(s) 1760 and untrusted app subnet(s) 1762 of the data plane app tier 1746 and the internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include one or more primary VNICs 1764(1)-(N) that can be communicatively coupled to tenant virtual machines (VMs) 1766(1)-(N). Each tenant VM 1766(1)-(N) can be communicatively coupled to a respective app subnet 1767(1)-(N) that can be contained in respective container egress VCNs 1768(1)-(N) that can be contained in respective customer tenancies 1770(1)-(N). Respective secondary VNICs 1772(1)-(N) can facilitate communication between the untrusted app subnet(s) 1762 contained in the data plane VCN 1718 and the app subnet contained in the container egress VCNs 1768(1)-(N). Each container egress VCNs 1768(1)-(N) can include a NAT gateway 1738 that can be communicatively coupled to public internet 1754 (e.g. public internet 1554 of FIG. 15).

The internet gateway 1734 contained in the control plane VCN 1716 and contained in the data plane VCN 1718 can be communicatively coupled to a metadata management service 1752 (e.g. the metadata management system 1552 of FIG. 15) that can be communicatively coupled to public internet 1754. Public internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some embodiments, the data plane VCN 1718 can be integrated with customer tenancies 1770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1746. Code to run the function may be executed in the VMs 1766(1)-(N), and the code may not be configured to run anywhere else on the data plane VCN 1718. Each VM 1766(1)-(N) may be connected to one customer tenancy 1770. Respective containers 1771(1)-(N) contained in the VMs 1766(1)-(N) may be configured to run the code. In this case, there can be a dual isolation (e.g., the containers 1771(1)-(N) running code, where the containers 1771(1)-(N) may be contained in at least the VM 1766(1)-(N) that are contained in the untrusted app subnet(s) 1762), which may help prevent incorrect or otherwise undesirable code from damaging the network of the IaaS provider or from damaging a network of a different customer. The containers 1771(1)-(N) may be communicatively coupled to the customer tenancy 1770 and may be configured to transmit or receive data from the customer tenancy 1770. The containers 1771(1)-(N) may not be configured to transmit or receive data from any other entity in the data plane VCN 1718. Upon completion of running the code, the IaaS provider may kill or otherwise dispose of the containers 1771(1)-(N).

In some embodiments, the trusted app subnet(s) 1760 may run code that may be owned or operated by the IaaS provider. In this embodiment, the trusted app subnet(s) 1760 may be communicatively coupled to the DB subnet(s) 1730 and be configured to execute CRUD operations in the DB subnet(s) 1730. The untrusted app subnet(s) 1762 may be communicatively coupled to the DB subnet(s) 1730, but in this embodiment, the untrusted app subnet(s) may be configured to execute read operations in the DB subnet(s) 1730. The containers 1771(1)-(N) that can be contained in the VM 1766(1)-(N) of each customer and that may run code from the customer may not be communicatively coupled with the DB subnet(s) 1730.

In other embodiments, the control plane VCN 1716 and the data plane VCN 1718 may not be directly communicatively coupled. In this embodiment, there may be no direct communication between the control plane VCN 1716 and the data plane VCN 1718. However, communication can occur indirectly through at least one method. An LPG 1710 may be established by the IaaS provider that can facilitate communication between the control plane VCN 1716 and the data plane VCN 1718. In another example, the control plane VCN 1716 or the data plane VCN 1718 can make a call to cloud services 1756 via the service gateway 1736. For example, a call to cloud services 1756 from the control plane VCN 1716 can include a request for a service that can communicate with the data plane VCN 1718.

Figure 18:
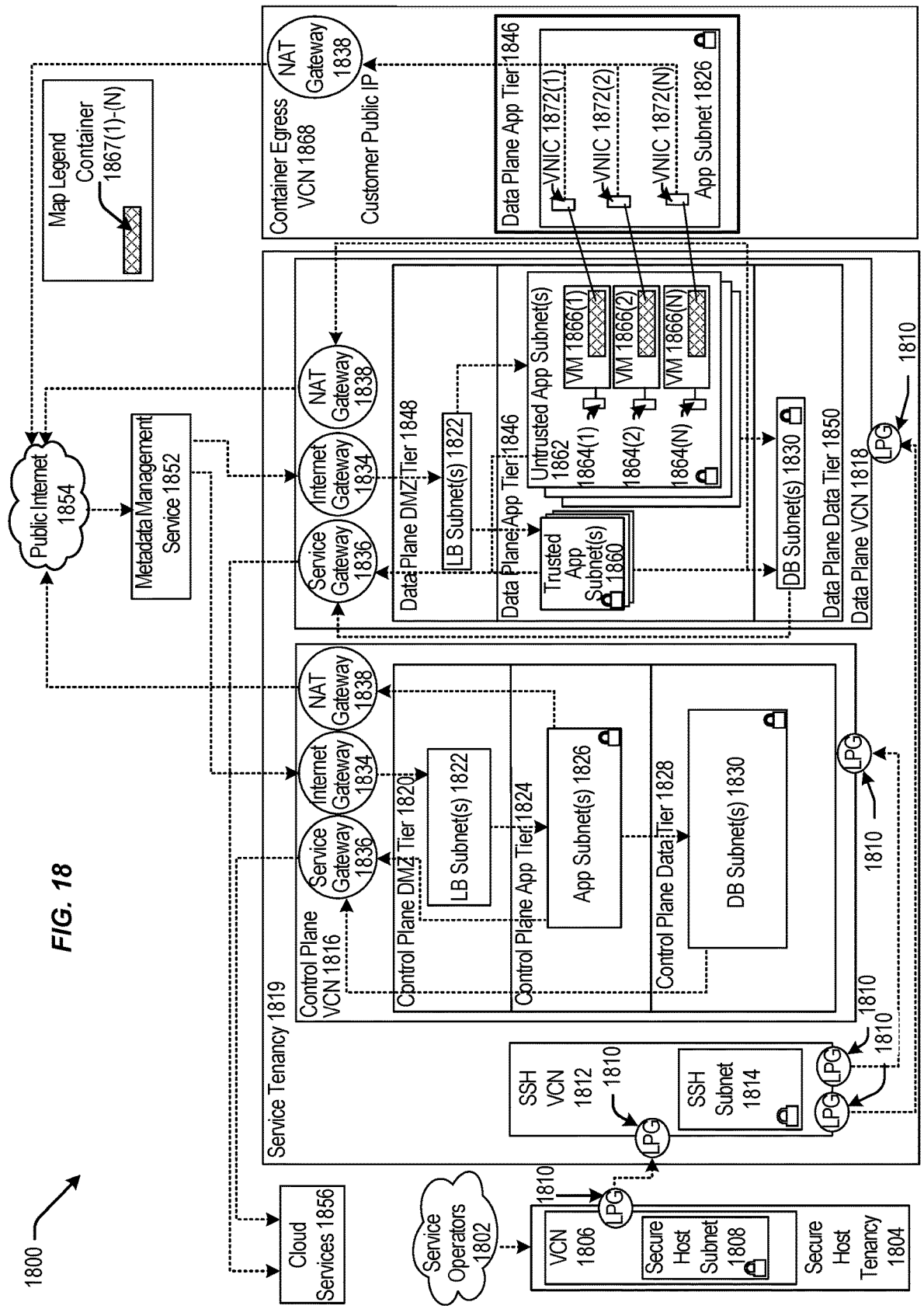
FIG. 18 is a block diagram illustrating another example of a pattern of an IaaS architecture according to certain embodiments.

FIG. 18 is a block diagram 1800 illustrating another example pattern of an IaaS architecture, according to at least one embodiment. Service operators 1802 (e.g. service operators 1502 of FIG. 15) can be communicatively coupled to a secure host tenancy 1804 (e.g. the secure host tenancy 1504 of FIG. 15) that can include a virtual cloud network (VCN) 1806 (e.g. the VCN 1506 of FIG. 15) and a secure host subnet 1808 (e.g. the secure host subnet 1508 of FIG. 15). The VCN 1806 can include an LPG 1810 (e.g. the LPG 1510 of FIG. 15) that can be communicatively coupled to an SSH VCN 1812 (e.g. the SSH VCN 1512 of FIG. 15) via an LPG 1810 contained in the SSH VCN 1812. The SSH VCN 1812 can include an SSH subnet 1814 (e.g. the SSH subnet 1514 of FIG. 15), and the SSH VCN 1812 can be communicatively coupled to a control plane VCN 1816 (e.g. the control plane VCN 1516 of FIG. 15) via an LPG 1810 contained in the control plane VCN 1816 and to a data plane VCN 1818 (e.g. the data plane 1518 of FIG. 15) via an LPG 1810 contained in the data plane VCN 1818. The control plane VCN 1816 and the data plane VCN 1818 can be contained in a service tenancy 1819 (e.g. the service tenancy 1519 of FIG. 15).

The control plane VCN 1816 can include a control plane DMZ tier 1820 (e.g. the control plane DMZ tier 1520 of FIG. 15) that can include LB subnet(s) 1822 (e.g. LB subnet(s) 1522 of FIG. 15), a control plane app tier 1824 (e.g. the control plane app tier 1524 of FIG. 15) that can include app subnet(s) 1826 (e.g. app subnet(s) 1526 of FIG. 15), a control plane data tier 1828 (e.g. the control plane data tier 1528 of FIG. 15) that can include DB subnet(s) 1830 (e.g. DB subnet(s) 1730 of FIG. 17). The LB subnet(s) 1822 contained in the control plane DMZ tier 1820 can be communicatively coupled to the app subnet(s) 1826 contained in the control plane app tier 1824 and to an internet gateway 1834 (e.g. the internet gateway 1534 of FIG. 15) that can be contained in the control plane VCN 1816, and the app subnet(s) 1826 can be communicatively coupled to the DB subnet(s) 1830 contained in the control plane data tier 1828 and to a service gateway 1836 (e.g. the service gateway of FIG. 15) and a network address translation (NAT) gateway 1838 (e.g. the NAT gateway 1538 of FIG. 15). The control plane VCN 1816 can include the service gateway 1836 and the NAT gateway 1838.

The data plane VCN 1818 can include a data plane app tier 1846 (e.g. the data plane app tier 1546 of FIG. 15), a data plane DMZ tier 1848 (e.g. the data plane DMZ tier 1548 of FIG. 15), and a data plane data tier 1850 (e.g. the data plane data tier 1550 of FIG. 15). The data plane DMZ tier 1848 can include LB subnet(s) 1822 that can be communicatively coupled to trusted app subnet(s) 1860 (e.g. trusted app subnet(s) 1760 of FIG. 17) and untrusted app subnet(s) 1862 (e.g. untrusted app subnet(s) 1762 of FIG. 17) of the data plane app tier 1846 and the internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include primary VNICs 1864(1)-(N) that can be communicatively coupled to tenant virtual machines (VMs) 1866(1)-(N) residing within the untrusted app subnet(s) 1862. Each tenant VM 1866(1)-(N) can run code in a respective container 1867(1)-(N), and be communicatively coupled to an app subnet 1826 that can be contained in a data plane app tier 1846 that can be contained in a container egress VCN 1868. Respective secondary VNICs 1872(1)-(N) can facilitate communication between the untrusted app subnet(s) 1862 contained in the data plane VCN 1818 and the app subnet contained in the container egress VCN 1868. The container egress VCN can include a NAT gateway 1838 that can be communicatively coupled to public internet 1854 (e.g. public internet 1554 of FIG. 15).

The internet gateway 1834 contained in the control plane VCN 1816 and contained in the data plane VCN 1818 can be communicatively coupled to a metadata management service 1852 (e.g. the metadata management system 1552 of FIG. 15) that can be communicatively coupled to public internet 1854. Public internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some examples, the pattern illustrated by the architecture of block diagram 1800 of FIG. 18 may be considered an exception to the pattern illustrated by the architecture of block diagram 1700 of FIG. 17 and may be desirable for a customer of the IaaS provider if the IaaS provider cannot directly communicate with the customer (e.g., a disconnected region). The respective containers 1867(1)-(N) that are contained in the VMs 1866(1)-(N) for each customer can be accessed in real-time by the customer. The containers 1867(1)-(N) may be configured to make calls to respective secondary VNICs 1872(1)-(N) contained in app subnet(s) 1826 of the data plane app tier 1846 that can be contained in the container egress VCN 1868. The secondary VNICs 1872(1)-(N) can transmit the calls to the NAT gateway 1838 that may transmit the calls to public internet 1854. In this example, the containers 1867(1)-(N) that can be accessed in real-time by the customer can be isolated from the control plane VCN 1816 and can be isolated from other entities contained in the data plane VCN 1818. The containers 1867(1)-(N) may also be isolated from resources from other customers.

In other examples, the customer can use the containers 1867(1)-(N) to call cloud services 1856. In this example, the customer may run code in the containers 1867(1)-(N) that requests a service from cloud services 1856. The containers 1867(1)-(N) can transmit this request to the secondary VNICs 1872(1)-(N) that can transmit the request to the NAT gateway that can transmit the request to public internet 1854. Public internet 1854 can transmit the request to LB subnet(s) 1822 contained in the control plane VCN 1816 via the internet gateway 1834. In response to determining the request is valid, the LB subnet(s) can transmit the request to app subnet(s) 1826 that can transmit the request to cloud services 1856 via the service gateway 1836.

It should be appreciated that IaaS architectures 1500, 1600, 1700, 1800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 19:
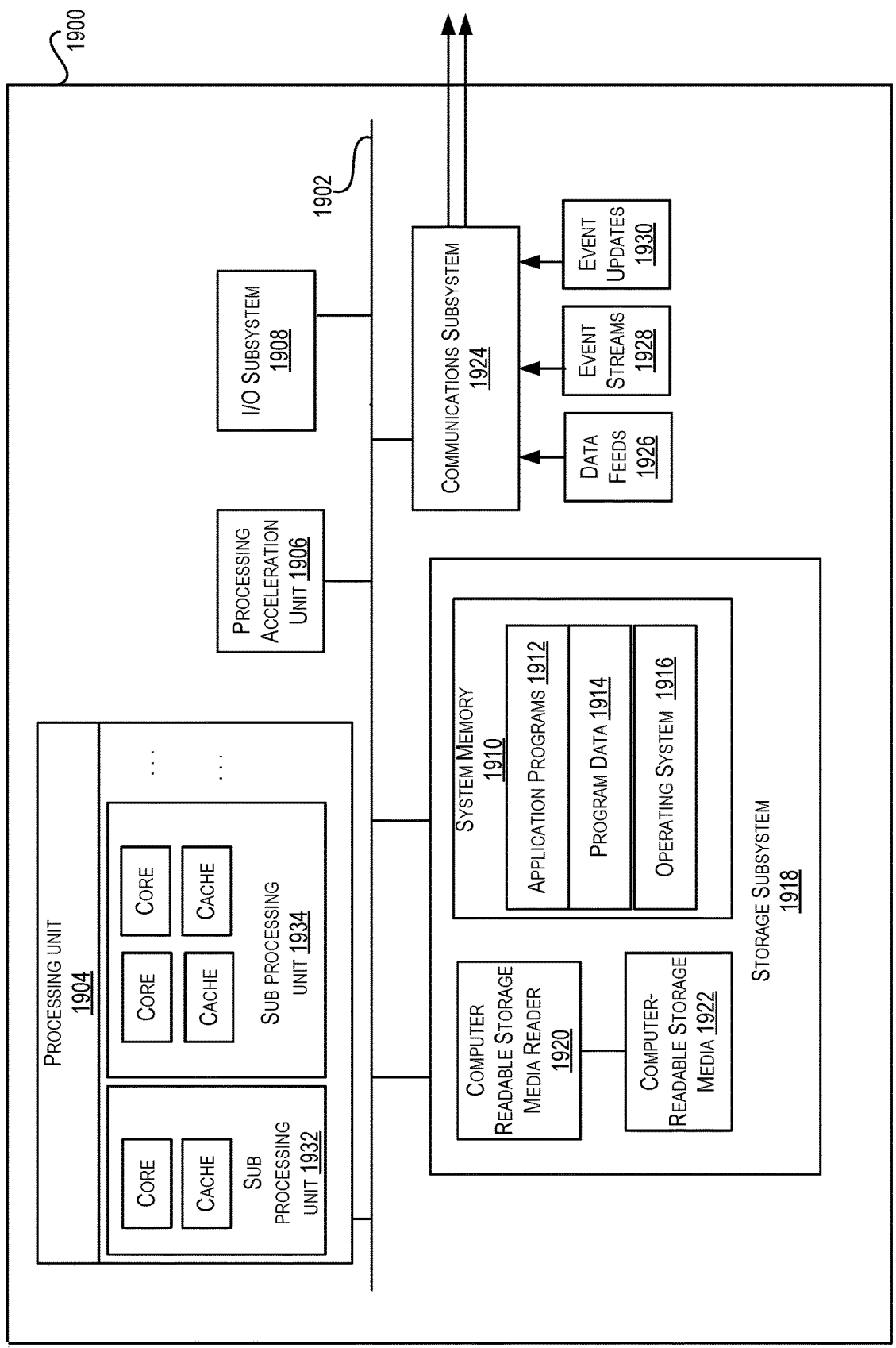
FIG. 19 illustrates an example computer system, in which various embodiments may be implemented.

FIG. 19 illustrates an example computer system 1900, in which various embodiments may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 19 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present disclosure.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The word "example" and "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a network device configured to perform network address translation (NAT) operations, a packet that comprises a header, wherein the header indicates a source address of a first computing resource in a first network, a destination address of a second computing resource in a second network, and a network identifier associated with the first network;
   determining, by the network device, the network identifier from the header of the packet;
   determining, by the network device, a first pool of flow identifiers from a plurality of pools based on the network identifier, wherein the first pool is available for first NAT operations between the first network and the second computing resource, wherein each flow identifier of the first pool is specific to a packet flow between a source computing resource of the first network and the second computing resource and is usable to determine NAT information related to the packet flow;
   identifying, by the network device, the packet flow based on the header;
   determining, by the network device, that no flow identifier from the first pool of flow identifiers has been allocated for the packet flow;
   determining, by the network device, a flow identifier available to allocate for the packet flow from the first pool of flow identifiers; and
   performing, by the network device, a NAT operation on the packet based on the flow identifier, wherein performing the NAT operation comprises replacing at least a portion of the header of the packet with the flow identifier.

2. The method of claim 1, wherein determining the flow identifier comprises:
   selecting, by the network device, the flow identifier from the first pool of flow identifiers; and
   determining, by the network device, that the flow identifier is allocable to the packet flow based on a request to a database and a response from the database, wherein the database maintains information about flow identifiers allocated for packet flows processed by a plurality of network devices, the plurality of network devices including the network device receiving the packet.

3. The method of claim 1, wherein the flow identifier is a first flow identifier,
   wherein determining the flow identifier comprises:
   selecting, by the network device, a second flow identifier from the first pool of flow identifiers;
   sending, by the network device, a request to a database about the second flow identifier, wherein the database maintains information about flow identifiers allocated for packet flows processed by a plurality of network devices, the plurality of network devices including the network device receiving the packet; and
   receiving, by the network device from the database, a response indicating that the second flow identifier is unusable and indicating that the first flow identifier is allocable for the packet flow.

4. The method of claim 1, further comprising:
   storing, by the network device in one or more data structures, the first pool, first information indicating allocations of a first set of flow identifiers from the first pool to packet flows, and second information indicating an order of allocating second flow identifiers that are available from the first pool and that have not been allocated yet;
   selecting, by the network device, the flow identifier based on the second information; and
   updating, by the network device, the one or more data structures to indicate that the flow identifier is allocated for the packet flow.

5. The method of claim 1, further comprising:
   storing, by the network device in a first data structure, first information indicating an allocation of the first pool for packet flows between the first network and the second computing resource, the first data structure stored in a memory of the network device; and
   storing, by the network device in a second data structure, second information indicating an allocation of the flow identifier for the packet flow, the second data structure stored in the memory of the network device.

6. The method of claim 1, wherein determining that no flow identifier has been allocated for the packet flow comprises a first lookup of a first data structure that is stored in a memory of the network device and that indicates flow identifiers that have been allocated for packet flows, and wherein determining the flow identifier available to allocate for the packet flow comprises a second lookup of a second data structure that is stored in the memory and that indicates an allocable sequence of available flow identifiers from the first pool.

7. The method of claim 6, wherein determining the flow identifier comprises:
   selecting, by the network device, the flow identifier based on the flow identifier being a next available flow identifier according to the allocable sequence;
   sending, by the network device to a database, an indication that the flow identifier is selected for allocation to the packet flow, wherein the database maintains information about flow identifiers allocated for packet flows processed by a plurality of network devices, the plurality of network devices including the network device receiving the packet; and receiving, by the network device from the database, an indication that the flow identifier is allocable.

8. The method of claim 6, wherein determining the flow identifier comprises:

selecting, by the network device, a different flow identifier based on the different flow identifier being a next available flow identifier according to the allocable sequence;

sending, by the network device to a database, an indication that the flow identifier is selected for allocation to the packet flow, wherein the database maintains information about flow identifiers allocated for packet flows processed by a plurality of network devices, the plurality of network devices including the network device receiving the packet;

receiving, by the network device from the database, an error message indicating the different flow identifier is not allocable and indicating that the flow identifier is allocable; and removing, by the network device, the flow identifier and adding back the different flow identifier from the second data structure.

9. The method of claim 8, wherein determining the flow identifier comprises:

selecting, by the network device, a different flow identifier based on the different flow identifier being a next available flow identifier according to the allocable sequence;

sending, by the network device to a database, an indication that the flow identifier is selected for allocation to the packet flow, wherein the database maintains information about flow identifiers allocated for packet flows processed by a plurality of network devices, the plurality of network devices including the network device receiving the packet; and receiving, by the network device from the database, an error message indicating the packet flow has already been mapped to the flow identifier.

10. The method of claim 1 wherein determining the first pool of flow identifiers comprises:

determining, by the network device, that no pool of flow identifiers of a plurality of pools has been allocated for second NAT operations specific to the first network and the second computing resource; and selecting, by the network device, the pool of flow identifiers for second NAT operations specific to the first network and the second computing resource.

11. The method of claim 10, wherein determining the first pool of flow identifiers further comprises storing, by the network device in a first data structure, first information indicating an allocation of the first pool of flow identifiers for second NAT, operations specific to the first network and the second computing resource, the first data structure stored in a memory of the network device.

12. The method of claim 10, wherein determining the first pool of flow identifiers further comprises determining, by the network device, that the first pool of flow identifiers is allocable to second NAT operations specific to the first network and the second computing resource based on a request to a database and a response from the database, wherein the database maintains information about pools of flow identifiers allocated for first NAT operations between source networks and target computing resources processed by a plurality of network devices, the plurality of network devices including the network device receiving the packet.

13. A network device comprising:

one or more processors; and one or more memories storing computer-readable instructions that upon execution by the one or more processors, configure the network device to:

receive a packet that comprises a header, wherein the header indicates a source address of a first computing resource in a first network, a destination address of a second computing resource in a second network, and a network identifier associated with the first network;

determine the network identifier from the header of the packet;

determine a first pool of flow identifiers from a plurality of pools based on the network identifier, wherein the first pool is available for first network address translation (NAT) operations between the first network and second computing resource, wherein each flow identifier of the first pool is specific to a packet flow between a source computing resource of the first network and the second computing resource and is usable to determine NAT information related to the packet flow;

identify the packet flow based on the header;

determine that no flow identifier from the first pool of flow identifiers has been allocated for the packet flow;

determine a flow identifier available to allocate for the packet flow from the first pool of flow identifiers; and perform a NAT operation on the packet based on the flow identifier, wherein performing the NAT operation comprises replacing at least a portion of the header of the packet with the flow identifier.

14. The network device of claim 13, wherein the flow identifier is determined by at least determining, based on a lookup of a database, that the flow identifier is allocable to the packet flow, wherein the database maintains information about flow identifiers allocated for packet flows processed by a plurality of network devices, the plurality of network devices including the network device receiving the packet.

15. The network device of claim 14, wherein the execution of the computer-readable instructions further configures the network device to:

synchronize a first data structure stored in a memory of the network device with a second data structure stored in the database, wherein the second data structure comprises the information about flow identifiers allocated for the packet flows.

16. The network device of claim 13, wherein the execution of the computer-readable instructions further configures the network device to:

store, in a first ring buffer, available pools of the plurality of pools and a first allocation sequence of the available pools; and store, in a first data structure, first information indicating a first allocation of the first pool from the available pools for the first network and the second computing resource, wherein the first allocation is based on the first allocation sequence.

17. The network device of claim 16, wherein the execution of the computer-readable instructions further configures the network device to:

store, in a second ring buffer, available flow identifiers from the first pool and a second allocation sequence of the available flow identifier; and store, in a second data structure, second information indicating a second allocation of flow identifier for the packet flow, wherein the second allocation is based on the second allocation sequence.

18. A system comprising:
a first network device comprising:
  first one or more processors; and
  first one or more memories storing first computer-readable instructions that upon execution by the first one or more processors, configure the first network device to:
    receive a packet that comprises a header, wherein the header indicates a source address of a first computing resource in a first network, a destination address of a second computing resource in a second network, and a network identifier associated with the first network;
    determine the network identifier from the header of the packet;
    determine a first pool of flow identifiers from a plurality of pools based on the network identifier, wherein the first pool is available for first network address translation (NAT) operations between the first network and the second computing resource, wherein each flow identifier of the first pool is specific to a packet flow between a source computing resource of the first network and the second computing resource and is usable to determine NAT information related to the packet flow;
    identify the packet flow based on the header;
    determine that no flow identifier from the first pool of flow identifiers has been allocated for the packet flow;
    determine a flow identifier available to allocate for the packet flow from the first pool of flow identifiers; and
    perform a NAT operation on the packet based on the flow identifier, wherein performing the first NAT operation comprises replacing at least a portion of the header of the packet with the flow identifier.

19. The system of claim 18 further comprising:
a second network device comprising:
  second one or more processors; and
  second one or more memories storing second computer-readable instructions that upon execution by the second one or more processors, configure the second network device to:
    receive a second packet that comprises a second header, wherein the second header indicates the source address of the first computing resource and the destination address of the second computing resource;
    identify the packet flow based on the second header;
    determine, based on a database, that the flow identifier has been allocated for the packet flow, wherein the database is communicatively coupled with the first network device and the second network device; and
    perform a second NAT operation on the second packet based on the flow identifier.

* * * * *

UNITED STATES PATENT AND TRADEMARK OFFICE
CERTIFICATE OF CORRECTION

PATENT NO. : 12,155,621 B2
APPLICATION NO. : 17/514488
DATED : November 26, 2024
INVENTOR(S) : Vinayakumar et al.

It is certified that error appears in the above-identified patent and that said Letters Patent is hereby corrected as shown below:

In the Drawings

On sheet 9 of 19, in FIG. 9, Line 12, delete "Pooll" and insert -- Pool --, therefor.

In the Specification

In Column 3, Line 61, delete "flow" and insert -- flow. --, therefor.

In Column 16, Line 2, delete "the a" and insert -- a --, therefor.

In Column 18, Line 62, delete "ICWIP" and insert -- ICMP --, therefor.

In Column 23, Line 51, delete "F" and insert -- Γ --, therefor.

In Column 28, Line 51, delete "interne," and insert -- internet, --, therefor.

In the Claims

In Column 47, Line 57, in Claim 11, delete "NAT," and insert -- NAT --, therefor.

Signed and Sealed this
First Day of April, 2025

Coke Morgan Stewart
*Acting Director of the United States Patent and Trademark Office*